(12) United States Patent
Kenney et al.

(10) Patent No.: US 8,790,758 B2
(45) Date of Patent: Jul. 29, 2014

(54) UNI-DIRECTIONAL FIBER COMPOSITE STRUCTURE

(71) Applicant: Apple Inc., Cupertino, CA (US)

(72) Inventors: Kevin M. Kenney, San Jose, CA (US); Robert Michael Merritt, Shenzhen (CN); Andrew D. Lauder, Oxford (GB); Santhana K. Balaji, Cupertino, CA (US); Jared A. Sartee, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/725,891

(22) Filed: Dec. 21, 2012

(65) Prior Publication Data

US 2013/0236667 A1  Sep. 12, 2013

Related U.S. Application Data

(60) Provisional application No. 61/607,165, filed on Mar. 6, 2012.

(30) Foreign Application Priority Data

Mar. 6, 2012 (WO) .................. PCT/US2012/02792

(51) Int. Cl.
*A47G 19/22* (2006.01)
*B29D 22/00* (2006.01)

(52) U.S. Cl.
USPC ........................................ 428/34.5; 428/36.1

(58) Field of Classification Search
USPC ............................................... 428/36.1, 34.5
See application file for complete search history.

(56) References Cited

U.S. PATENT DOCUMENTS

| | | | |
|---|---|---|---|
| 3,307,990 | A | 3/1967 | Homier et al. |
| 4,259,568 | A | 3/1981 | Dynesen |
| 7,907,394 | B2 | 3/2011 | Richardson et al. |
| 8,345,414 | B2 | 1/2013 | Mooring et al. |

(Continued)

FOREIGN PATENT DOCUMENTS

| | | |
|---|---|---|
| GB | 2 482 931 | 2/2012 |
| GB | 2482931 | 2/2012 |
| WO | 9206838 | 4/1992 |
| WO | WO 92/06838 | 4/1992 |

OTHER PUBLICATIONS

"Carbon fibre and glass fibre hybrid reinforced plastics," Summerscales, J. et al., Composites, IPC Business Press Ltd., vol. 9, No. 3, Jul. 1, 1978.

(Continued)

*Primary Examiner* — James Yager
(74) *Attorney, Agent, or Firm* — Womble Carlyle Sandridge & Rice LLP

(57) ABSTRACT

An accessory unit includes a front flap and a rear cover. The rear cover includes a recessed portion that defines a chamber and a frame that extends about an opening of the chamber. The chamber is configured to receive a consumer electronic device, and the frame is configured to hold the consumer electronic device therein. For example, the frame may define a multi-sided cross-section with an inner edge thereof configured to engage a chamfered edge of the consumer electronic device. The front flap may include segments formed from panels with folding regions therebetween, which allow the front flap to fold. Further, an end region of the front flap hingedly couples the front flap to the rear cover, such that the front flap may be moved between open and closed configurations.

18 Claims, 20 Drawing Sheets

(56) References Cited

U.S. PATENT DOCUMENTS

| | | |
|---|---|---|
| 2006/0086520 A1 | 4/2006 | Romano |
| 2007/0145631 A1 | 6/2007 | Salzmann |
| 2010/0316229 A1 | 12/2010 | Bibl et al. |
| 2011/0163642 A1 | 7/2011 | Rohrbach et al. |
| 2011/0281044 A1 | 11/2011 | Michail et al. |
| 2013/0034740 A1 | 2/2013 | Giachino et al. |
| 2013/0045759 A1 | 2/2013 | Smith |
| 2013/0147330 A1 | 6/2013 | Difonzo et al. |
| 2013/0233762 A1 | 9/2013 | Balaji et al. |

OTHER PUBLICATIONS

International Search Report in PCT Application No. PCT/US2012/027921, dated Nov. 7, 2012.

PCT/US2012/027921. Written Opinion (Nov. 7, 2012).

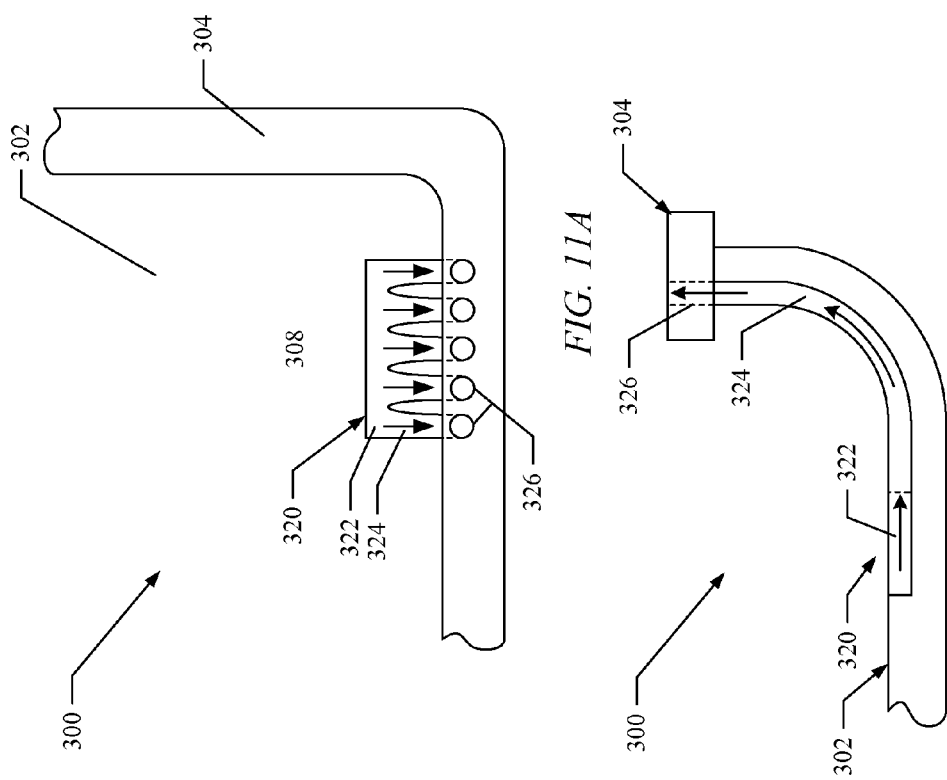

UNI-DIRECTIONAL FIBER COMPOSITE STRUCTURE

CROSS REFERENCE TO RELATED APPLICATIONS

This application is a continuation of International Application No. PCT/US2012/027921, with an international filing date of Mar. 6, 2012, entitled "ACCESSORY UNITS FOR CONSUMER ELECTRONIC DEVICES AND RELATED ASSEMBLIES AND METHODS" by Balaji et al., and also claims priority under 35 U.S.C. §119(e) to U.S. Provisional Application No. 61/607,165, filed Mar. 6, 2012 and entitled "ACCESSORY UNITS FOR CONSUMER ELECTRONIC DEVICES AND RELATED ASSEMBLIES AND METHODS" by Balaji et al., each of which are incorporated by reference in their entirety for all purposes.

TECHNICAL FIELD

The present disclosure relates generally to accessory units, and more particularly to accessory units for consumer electronic devices and related assemblies and methods.

BACKGROUND

As advancements have been made in the field of consumer electronic devices, development of associated accessory units has also occurred. In this regard, some accessory units such as cases are designed to protect consumer electronic devices. Other accessory units are configured to provide consumer electronic devices with increased functionality.

While existing accessory units may function suitably for their intended purposes, further advancements may be desirable. For example, increased functionality or protection for the associated consumer electronic devices may be desirable.

Accordingly, a need for continued advancement is the field of accessory units may exist.

SUMMARY

This paper describes various embodiments of an accessory for an electronic device.

The present disclosure provides an accessory unit which may be combined with a consumer electronic device to form an assembly. The accessory unit may include a front flap with segments formed from panels and folding regions therebetween that provide the front flap with flexibility. The accessory unit may also include a rear cover that includes a recessed portion, which may be formed from a flexible material, and which defines a chamber. The rear cover may also include a frame coupled to the recessed portion that extends about an opening to the chamber.

The frame may be formed from a material that is relatively more rigid than the flexible material of the recessed portion. In this regard, the frame may function to retain a consumer electronic device in the chamber of the recessed portion via interference fit. For example, the frame may define a multi-sided cross-section, and an inner edge of the frame may be configured to engage a chamfered edge of the consumer electronic device. Thereby, the accessory unit may retain the consumer electronic device in the chamber while substantially avoiding blocking an upper surface of the consumer electronic device at which a display may be positioned.

The front flap may also include an end region that allows the front flap to pivot relative to the rear cover. The front flap may be formed from multiple layers of material, and the layers may only be bonded to one another at the longitudinal ends of the end region such that the end region is provided with increased flexibility. However, in order to improve alignment of the front flap with respect to the rear cover, an end segment may be provided in the end region of the front flap. The end segment may be formed from a panel of a relatively stiff material (e.g., steel). However, the end segment may not extend across the full width of the end region such that the end region remains flexible.

In one embodiment, an accessory unit is described. The accessory includes at least a front flap and a rear cover where the front flap includes a plurality of segments, a folding region between each of the segments arranged to allow the segments to fold with respect to each other, and an end region. The rear cover includes at least a recessed portion formed from a flexible material that defines a chamber and a frame coupled to the recessed portion and extending about an opening of the chamber where the frame is formed of a material that is more rigid than the flexible material of the recessed portion. In the described embodiments, the end region of the front flap hingedly couples the front flap to the rear cover and the front flap is configurable between a closed configuration in which the front flap at least partially covers the opening to the chamber and an open configuration in which the opening to the chamber is at least partially uncovered.

In another embodiment, the accessory unit is used to protect a consumer electronic device that is retained in the chamber by the frame, and where the end region of the front flap hingedly couples the front flap to the rear cover and the front flap is configurable between a closed configuration in which the front flap at least partially covers the display of the consumer electronic device and an open configuration in which the display of the consumer electronic device is at least partially uncovered.

In one aspect of the described embodiment, a current position of the front flap in relation to the consumer electronic product causes the consumer electronic product to operate in a state in accordance with the current position of the front flap.

In still another embodiment, a method for manufacturing an accessory unit is described. The method is carried out by providing a first sheet of material and a second sheet of material, inserting a plurality of panels between the first sheet of material and the second sheet of material, coupling the first sheet of material to the second sheet of material, forming the first sheet of material and the second sheet of material into a front flap that is substantially planar and a recessed portion that defines a chamber, and coupling a frame to the recessed portion extending about an opening of the chamber.

In yet another embodiment, a composite structure is described. The composite structure includes at least a multi-sided ring of stacked unidirectional fiber layers aligned in a first direction, each fiber layer formed from a layer of material having binder and unidirectional fibers and each fiber layer having opposing first and second surfaces, wherein the ring of multiple fiber layers has an outer edge formed by the first surface of an outermost one of the fiber layers and has an inner edge formed by the second surface of an innermost one of the fiber layers. The multi-sided composite structure also includes a first and second specifically defined region of reinforcing fiber infused with the plastic binder during a composite structure formation operation, the first and second regions being non-contiguous and on opposite sides of the composite structure, the reinforcing agent providing enhanced structural strength for the infused sides.

A method of forming a reinforced multi-sided composite structure from layers of unidirectional fiber material and reinforcing binder, each layer of unidirectional fiber having unidirectional fiber and binder is described. The method is carried out by wrapping multiple layers of the unidirectional fiber material around a drum, the unidirectional fiber material being aligned in a first direction, removing a ring of the wrapped layers of unidirectional fiber material from the drum, masking a first reinforced region by applying a first scrim layer on a first exterior surface of the multi-sided composite structure formed of the unidirectional fiber material aligned in a second direction, the second direction being different than the first direction, masking a second reinforced region by applying a second scrim layer on a second exterior surface of the multi-sided composite structure formed of the unidirectional fiber material aligned in the second direction, applying a first strip of reinforcing agent at an exterior surface of the first scrim layer, applying a second strip of reinforcing agent at an exterior surface of the second scrim layer, and heating the removed ring of the wrapped layers of unidirectional fiber material and first and second strips of reinforcing agent in a mold.

In yet another embodiment, method of forming a laminated fabritic structure is described. The method is carried out by performing at least the following operations: receiving a first layer of fabric, forming a first adhesive layer by pre-laminating a first adhesive layer to the first layer of fabric, receiving a second layer of fabric, adding the second layer of fabric proximate to the first layer of adhesive, heating the first and second layers of fabric and the first adhesive layer, forming the laminated fabritic structure by cooling the first and second layers of fabric and the first adhesive layer subsequent to the heating in a mold, wherein the first and second fabric layers take on the form of the mold and wherein the first adhesive layer provides a structural support layer for the laminated fabritic structure, and releasing residual stress in the laminated fabritic structure by alternately heating and cooling the laminated fabritic structure.

Related methods and assemblies are also provided. Other apparatuses, methods, features and advantages of the disclosure will be or will become apparent to one with skill in the art upon examination of the following figures and detailed description. It is intended that all such additional apparatuses, assemblies, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed accessory units, assemblies, and method for manufacturing accessory units. These drawings in no way limit any changes in form and detail that may be made to the disclosure by one skilled in the art without departing from the spirit and scope of the disclosure.

FIG. 11A illustrates a top view of a corner of the rear cover of the accessory unit comprising a cutout portion configured to act as an acoustic wave guide according to an example embodiment of the present disclosure;

FIG. 11B illustrates a side sectional view of the cutout portion of FIG. 11B;

DETAILED DESCRIPTION

Exemplary applications of apparatuses, assemblies, systems, and methods according to the present disclosure are described in this section. These examples are being provided solely to add context and aid in the understanding of the disclosure. It will thus be apparent to one skilled in the art that the present disclosure may be practiced without some or all of these specific details. In other instances, well known process steps have not been described in detail in order to avoid unnecessarily obscuring the present disclosure. Other applications are possible, such that the following examples should not be taken as limiting.

Accessory units are commonly used in conjunction with consumer electronic devices. Some accessory units are configured to protect consumer electronic devices. For example, cases may be employed to partially or fully surround a consumer electronic device such that the consumer electronic device is protected from damage. By way of further example, stands for consumer electronic devices may be configured to prop up the consumer electronic devices such that they may be conveniently positioned for interaction therewith. Another accessory unit can take the form of a foldable cover that can be detachably connected to, for example, a tablet computer, and having a protective flap an example of which is that of the SMART COVER™, which is produced by Apple, Inc. of Cupertino, Calif. This product is moveable between multiple configurations, including one configuration in which it functions as a cover and another configuration in which it functions as a stand. While the SMART COVER™ and other accessory units may perform in accordance with their intended purposes, additional advancements in accessory units may be desirable.

These and other embodiments are discussed below with reference to FIGS. 1-13. However, those skilled in the art will readily appreciate that the detailed description given herein with respect to these figures is for explanatory purposes only and should not be construed as limiting. For the remainder of this discussion, an accessory unit suitable for use with an electronic device will be described. In particular, for simplicity and clarity, for the remainder of this discussion, the electronic device takes the form of a handheld electronic device such as a tablet computer.

Figure 1A:
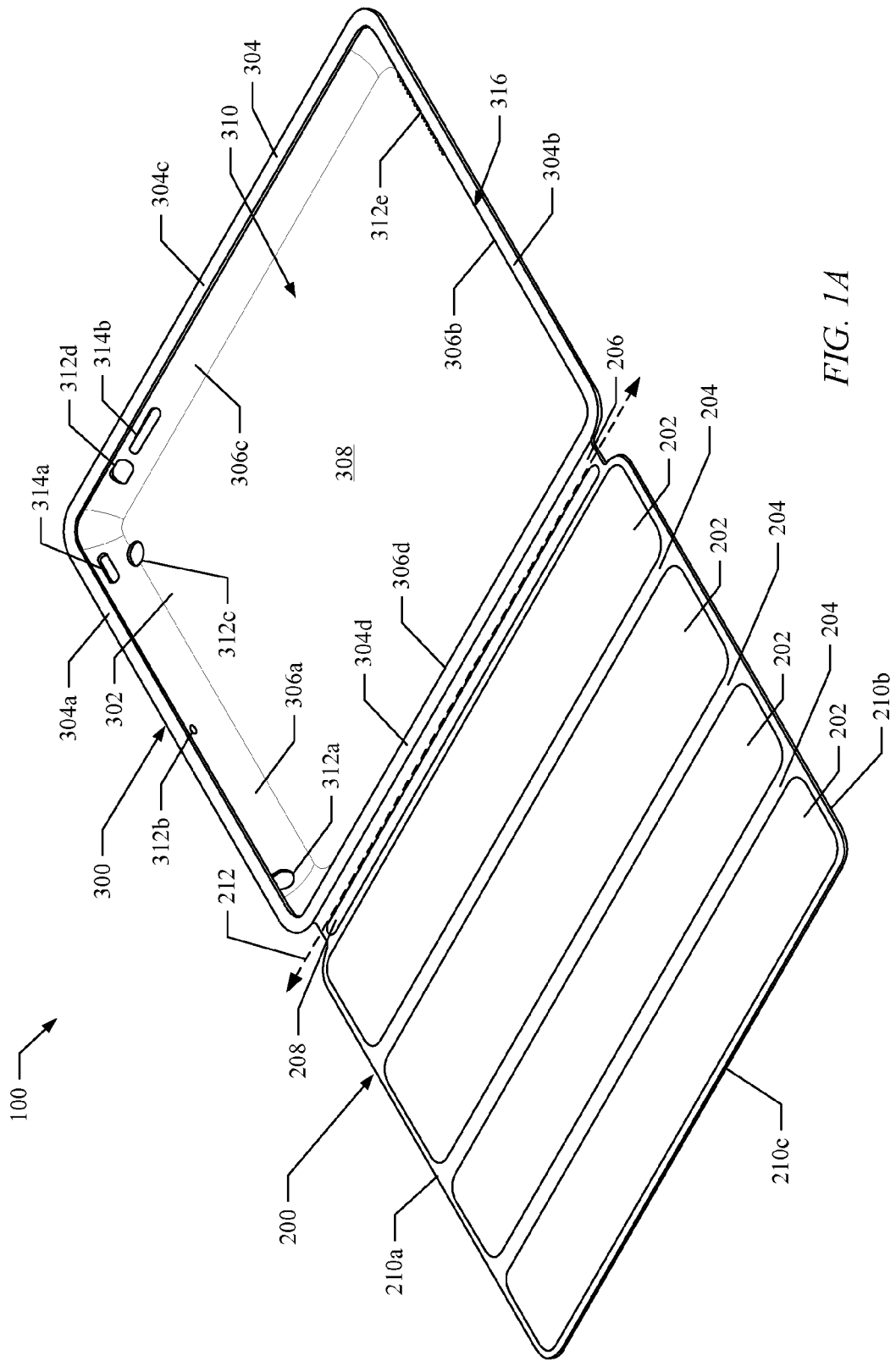
FIG. 1A illustrates a perspective view of an accessory unit comprising a front flap and a rear cover wherein the front flap is in an open configuration according to an example embodiment of the disclosure.
Figure 1B:
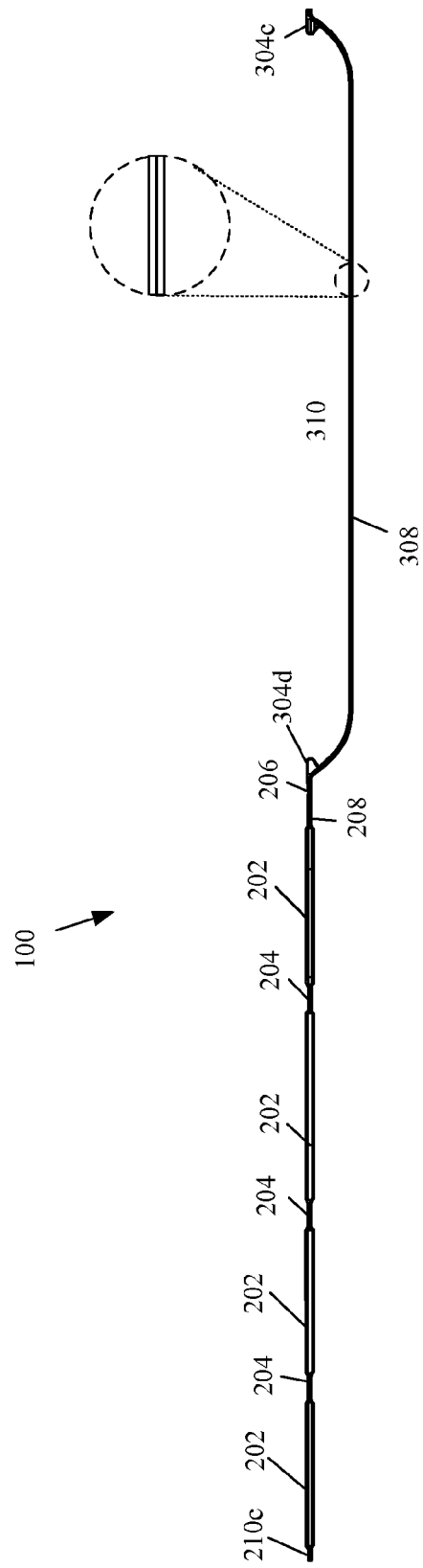
FIG. 1B shows a cross sectional view of the accessory unit shown in FIG. 1A in the open configuration.

In this regard, FIG. 1A illustrates an embodiment of an accessory unit 100 according to the present disclosure. As illustrated, the accessory unit 100 may comprise a front flap 200 and a rear cover 300. The front flap 200 may include a plurality of segments 202 and a folding region 204 positioned between each of the segments. The folding regions 204 may be configured to allow the segments 202 to fold with respect to each other. The front flap 200 may also include an end region 206. The end region 206 hingedly couples the front flap 200 to the rear cover 300.

In a specific embodiment, each of segments 202 can include one or more inserts disposed therein. By way of example, segments 202 can include a pocket region where the inserts are placed or alternatively the inserts may be embedded within the segments (e.g., via insert molding). If pockets are used, the pocket region can have a size and shape to accommodate corresponding inserts. The inserts can have various shapes but are most typically shaped to conform to the overall look of front flap 200 (e.g., rectangular). The inserts can be used to provide structural support for front flap 200. That is, the inserts can provide stiffness to the flap assembly. In some cases, the inserts may be referred to as stiffeners. The inserts can be formed of rigid or semi-rigid material adding resiliency to front flap 200. Examples of materials that can be used include plastics, fiber glass, carbon fiber composites, metals, and the like. Some of the inserts can be formed of resilient material such as plastic but also arranged to accommodate other components such as magnetic elements described below. Some of the magnetic elements can take the form of magnets at least one of which can interact with a magnetic sensor disposed within an electronic device associated with accessory unit 100. Some of the magnets can also be arranged to form a magnetic attraction with an attractable magnetic element disposed with at least one insert. In one embodiment, attractable magnetic element can be formed of steel, or other ferromagnetic material, and take the shape of a thin sheet incorporated within an insert.

Front flap 200 can be relatively stiff except along folding regions 204 that are thinner and do not include the inserts (e.g., allows folding) making front flap 200 more robust and easier to handle. In one embodiment segments 202-1, 202-2, and 202-3 can be related to segment 202-4 in size in the proportion of about 0.72 to 1 meaning that segments 202-1, 202-2, and 202-3 are sized in width to be about 72% of the width of segment 202-4. In this way, a triangular support structure having appropriate angles can be formed by positioning segments 202 in a manner described in U.S. patent application entitled, "CONSUMER ELECTRONIC PRODUCT" by Lauder et al. filed Dec. 17, 2010 having application Ser. No. 12/971,536 which is incorporated herein by reference in its entirety.

One approach to forming at least one triangular support structure can include segment 202-1 having a plurality of magnets and be arranged to fold with respect to segments 202-2 through 202-4 in such a way that at least one magnetic element within segment 202-1 magnetically attract a magnetically active insert within segment 202-4. In this way, segments 202-1 and segment 202-4 can be magnetically bound together forming a first triangular support structure. In one embodiment, the triangular support structure formed by folding segment 202-1 onto segment 202-4 can be used as a support structure for accessory device 100. In this way, any electronic component supported by accessory device 100 can also be supported. For example, when used as a support, an electronic device having a display and supported by accessory device 100 can be placed in such a way that visual content can be displayed at about 75° in relation to a horizontal surface. In another example, front flap 200 can be folded to form a second triangular support structure that can be used as a keyboard support. It should be noted, however, that these are only representative examples of many other support structures that can be formed by front flap 200.

The rear cover 300 may include a recessed portion 302, also referred to as a bucket, and a frame 304. The recessed portion 302 may include a plurality of sidewalls 306a-d (collectively, "306") and a bottom wall 308 that define a chamber 310. The recessed portion 302 may include one or more apertures 312a-e (collectively, "312") and/or one or more embossed portions 314a-b (collectively, "314").

The frame 304 may be coupled to the recessed portion 302 and extend about an opening 316 of the chamber 310. As will be described in further detail below, the recessed portion 302 of the rear cover 300 may be formed from a flexible material. Additionally, the frame 304 may be formed from a material that is more rigid than the flexible material of the recessed portion 302. In this regard, the frame 304 of the rear cover 300 may be configured to retain a consumer electronic device in the chamber 310, as discussed in detail below.

As noted, above, the end region 206 of the front flap 200 may hingedly couple the front flap to the rear cover 300. In order to stiffen the end region 206 such that the end region may maintain alignment of the front flap 200 with respect to the rear cover 300, the end region may include an end segment 208. In particular, the end segment 208 may be configured to strengthen the end region 206 such that the end region maintains alignment of outer edges 210a-c (collectively, "210") of the front flap 200 with respect to the frame 304 of the rear cover 300.

The end region 206 may include a material that is flexible and which thereby allows the end region to bend. However, as a result of employing a flexible material in the end region 206, without the end segment 208 the front flap 200 may tend to bend relative to the rear cover 300 at the end region in undesirable directions other than about a major axis 212 through the end region under certain circumstances. In this regard, the end segment 208 may be configured to prevent misalignment of the outer edges 210 of the front flap 200 with respect to the frame 304 when the accessory unit is subjected to forces in directions other than perpendicular to a major axis 212 through the end region 206.

Figure 2A:
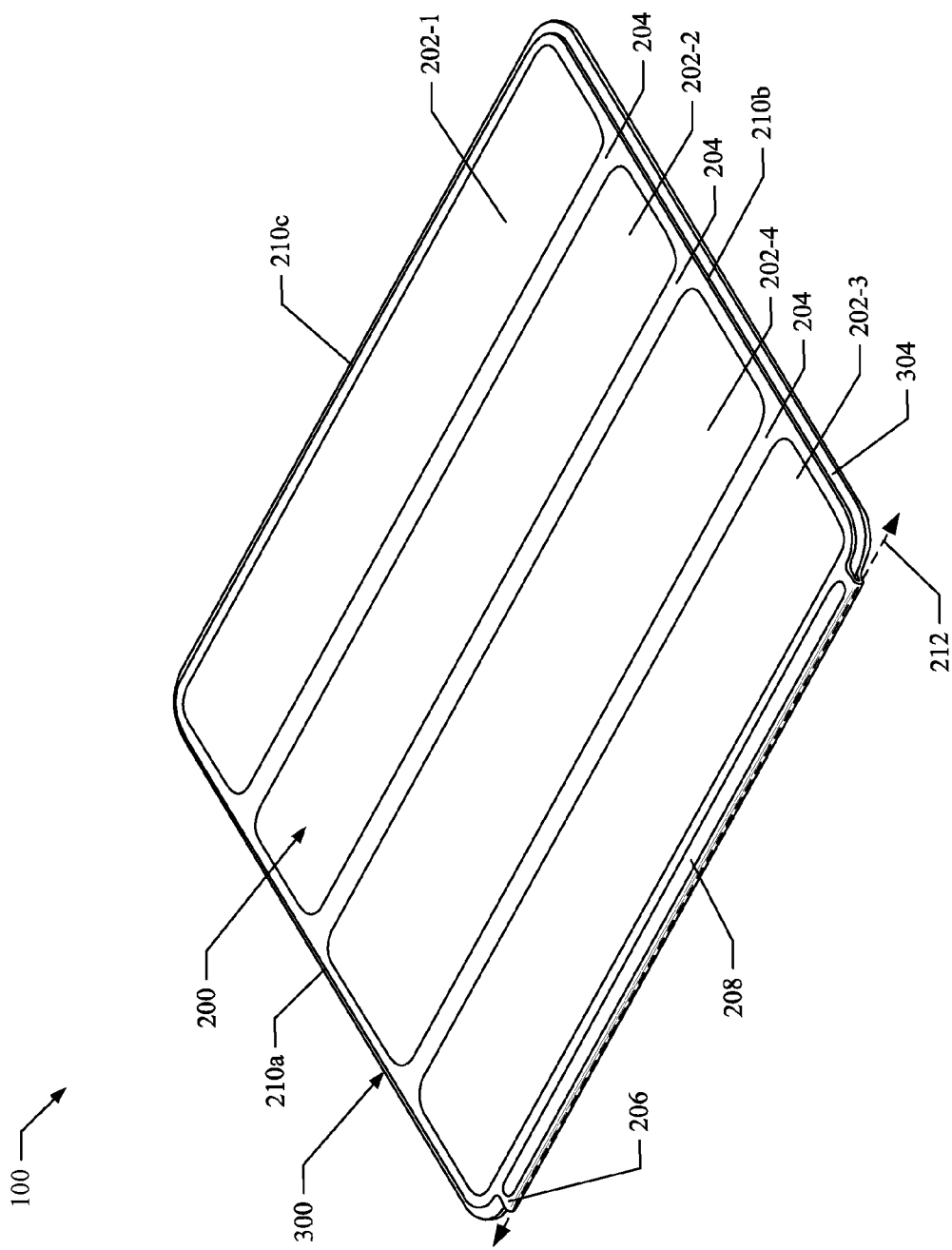
FIG. 2A illustrates a perspective view of the accessory unit of FIG. 1A with the front flap in a closed configuration.
Figure 2B:
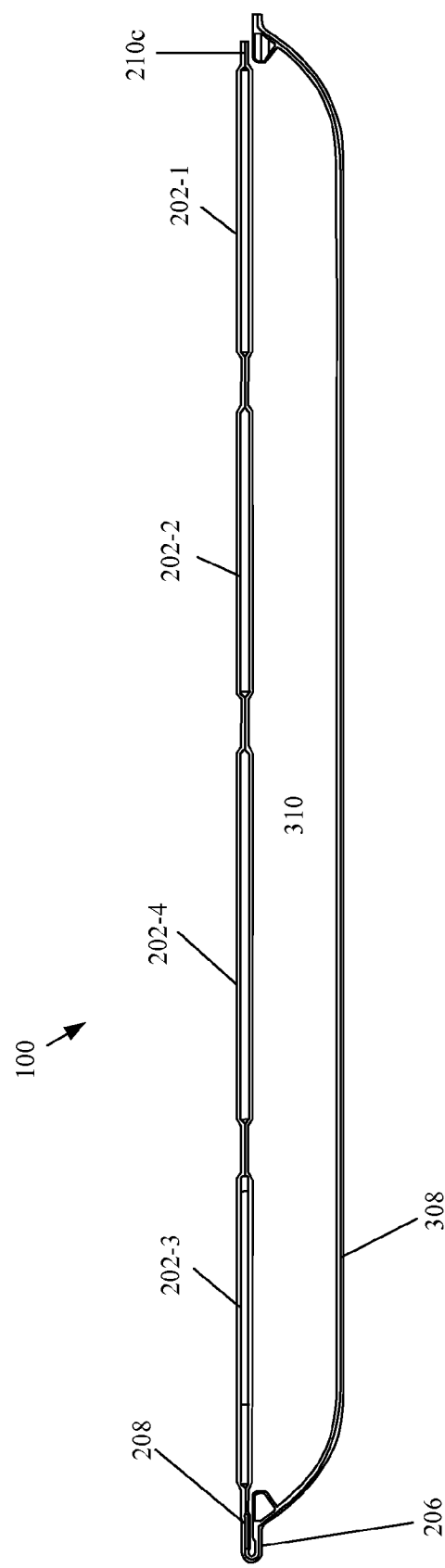
FIG. 2B illustrates a cross sectional view of the accessory unit of FIG. 2A with the front flap in a closed configuration.

The front flap 200 may be configurable between an open configuration (see, e.g., FIG. 1A) and a closed configuration (see, e.g., FIG. 2A). In the open configuration, the front flap 200 is displaced relative to the rear cover 300 such that the opening 316 to the chamber 310 is at least partially uncovered. For example, FIG. 1A illustrates a fully open configuration in which the front flap 200 is out of contact with the frame 304 and the front flap defines a substantially planar configuration. However, the front flap 200 may be configured in a variety of other open configurations, as discussed for example in U.S. patent application entitled, "CONSUMER ELECTRONIC PRODUCT" by Lauder et. al. filed Dec. 17, 2010 having application Ser. No. 12/971,536 which is incorporated herein by reference in its entirety.

As illustrated in FIG. 2A, the edges 210 of the front flap 200 may contact the frame 304 when the front flap is in the closed configuration. Accordingly, the front flap 200 may define a substantially planar configuration when moved to the closed configuration. In this regard, the end segment 208 may be substantially coplanar with the other segments 202 and the folding regions 204 of the front flap when the front flap is in the folded configuration. However, a portion of the end region 206 adjacent the end segment 208 bends to enable the end region to function as a hinge, as noted above.

In some embodiments, as illustrated in FIG. 2A, the frame 304 may extend outwardly beyond the edges 210 of the front flap 200. In this regard, the frame 304 may function to protect a consumer electronic device received in the chamber 310 in the rear cover 300 from damage to the edges thereof when dropped or otherwise subjected to impact. However, in other embodiments the edges 210 of the front flap 200 and the frame 304 may extend to the same dimensions, or the edges of the front flap may extend beyond the frame.

The material(s) defining the accessory unit 100 may vary. In one example embodiment, the entire accessory unit 100 may be formed from a single material. However, as noted above, in other embodiments it may be desirable to form the accessory unit 100 from multiple materials to take advantage of differing material properties.

Figure 3A:
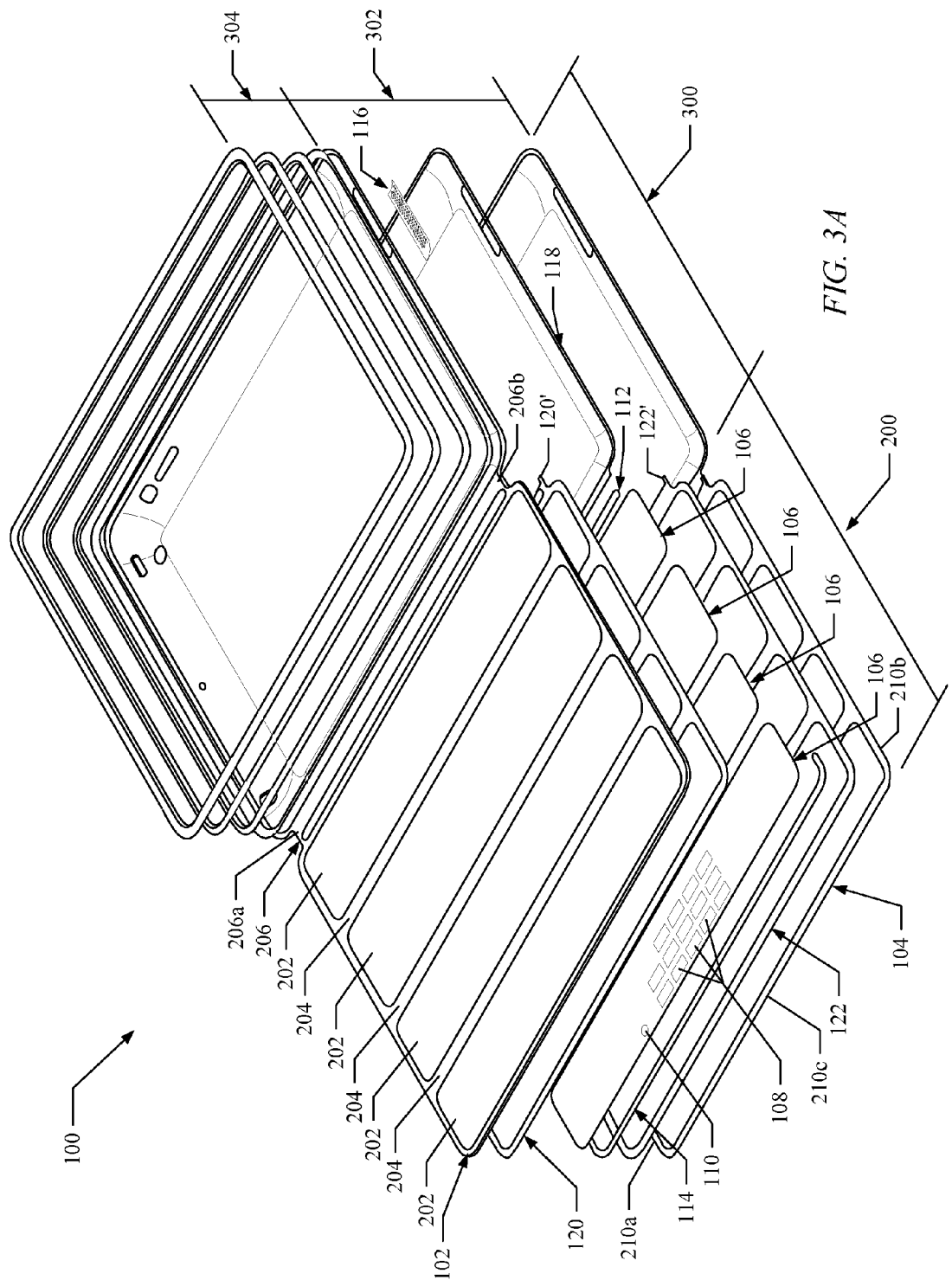
FIG. 3A illustrates an exploded perspective view of the accessory unit of FIG. 1A in the open configuration FIG. 3B schematically illustrates a method for forming a rigid structure from an adhesive and layers of fabric material according to an example embodiment of the present disclosure.

In this regard, FIG. 3A illustrates an exploded view of one embodiment of the accessory unit 100 in the open configuration. As illustrated, the accessory unit 100 may include a single sheet of material that defines an inner layer 102 of the front flap 200 and the recessed portion 302 of the rear cover 300. Further, the accessory unit 100 may include a single sheet of material that defines an outer layer 104 of the front flap 200 and the recessed portion 302 of the rear cover 300. In this regard, the recessed portion 302 of the rear cover 300 and the front flap 200 may be at least partially integrally formed in one embodiment. In this regard, a pleasing continuous appearance may be provided. However, the rear cover 300 and the front flap 200 may be formed from separate materials in other embodiments.

The material(s) defining the inner layer 102 and the outer layer 104 may be the same or different. In one embodiment the inner layer 102 may include a microfiber material and the outer layer 104 may include poly urethane type materials such as PUK. In this regard, the inner layer 102 and the outer layer 104 may include materials configured to provide durability, provide flexibility, protect a consumer electronic device, and/or a pleasing aesthetic appearance. In some embodiments the inner layer 102 may also be configured to passively clean the consumer electronic device, which may come into contact with the inner layer while held therein.

The accessory unit 100 may further include one or more additional materials between the inner layer 102 and the outer layer 104 in some embodiments. For example, the accessory unit 100 may include one or more panels 106. The panels 106, which may include fiberglass, steel, carbon fiber, plastic, or other relatively rigid materials in some embodiments, may be configured to define the structure of the segments 202 of the front flap 200. In turn, the areas between the panels 106 may define the folding regions 204 of the front flap 200, with the inner layer 102 and the outer layer 104 providing the folding regions with flexibility.

The accessory unit 100 may further include one or more magnetic elements in the front flap 200. For example, one or more magnetic elements 108 may be configured to interact with an attachment feature of a consumer electronic device received in the rear cover 300. For example, the magnetic elements 108 may be magnetically attracted to the attachment feature of the consumer electronic device when the accessory unit 100 is in a closed configuration such that the front flap 200 is releasably retained in this configuration. The front flap 200 may further include a magnetic element 110 configured to interact with a magnetically sensitive sensor configured to detect presence, absence, or a change from presence to absence or vice versa of the magnetic element. For example, the magnetically sensitive circuit may include a Hall Effect sensor. Various other details with respect to example embodiments of the magnetic elements 108, 110 of the accessory unit 100.

As an example, the Hall Effect sensor can respond to the presence (or absence) of the magnetic field by generating a signal. The signal can be used to alter an operating state of the electronic device. Accordingly, magnetic element 110 can be positioned on front flap 200 in a location that triggers the Hall Effect sensor to generate the signal when the cover is placed on or in proximity to a surface of the consumer electronic device. The signal can indicate that the front flap 200 is in a predetermined position relative to the consumer electronic device that can result in a change in an operating state of the consumer electronic device. For example, with the portion of front flap 200 having magnetic element 110 in proximity to the Hall Effect sensor, the magnetic field from magnetic element 110 can cause the Hall Effect sensor to generate a signal. The signal can, in turn, be used to alter the operating state to one consistent with functioning of the consumer electronic device being fully covered.

For example, in those situations where the consumer electronic device includes a display, the functioning of the consumer electronic product can be altered in such a way that the display is prevented from displaying visual content. On the other hand, when the portion of front flap 200 having magnetic element 110 is removed to the point where the Hall Effect sensor no longer responds to the magnetic field of magnetic element 110, then the Hall Effect sensor can generate another signal. The other signal can result in the consumer electronic device entering another, different, operating state consistent with at least a portion of the display being uncovered and viewable. As with the example of the consumer electronic product having a display, when the Hall Effect sensor no longer detects the magnetic field from magnetic element 110, then the functioning of the tablet computer can be altered such that the display is enabled to present visual content. It should be noted that the above described attachment feature, the magnetically sensitive circuit are discussed in U.S. patent application entitled, "CONSUMER ELECTRONIC PRODUCT" by Lauder et al. filed Dec. 17, 2010 having application Ser. No. 12/971,536 which is incorporated herein by reference in its entirety.

The accessory unit 100 may further include an end panel 112 between the inner layer 102 and the outer layer 104, which may be configured to define the structure of a portion of the end region 206 at the end segment 208. The end panel 112 may include fiberglass, steel, carbon fiber, plastic, or other relatively rigid materials in some embodiments. Accordingly, the material(s) defining the inner layer 102 and the outer layer 104 (e.g., microfiber and PUK) may include flexible materials that allow the front flap 200 to flex at the folding regions 204 and at the end region 206, whereas the material(s) defining the panels 106, 112 may provide rigidity and stiffness. The front flap 200 may also include a reinforcement bar 114. The reinforcement bar 114 may be configured to reinforce the outer edge 210c of the front flap 200 and the corners between the outer edge and the side edges 210a,b of the front flap. Accordingly, the reinforcement bar 114 may be formed from a relatively rigid material such as plastic, steel, carbon fiber, fiberglass, etc.

The accessory unit 100 may also include a speaker cover 116 in the rear cover 300 in some embodiments, as will be discussed below. In order to couple the various components of the front flap 200 and the rear cover 300 together, the accessory unit 100 may further include one or more adhesive layers. In the illustrated embodiment, the rear cover 300 may include an adhesive layer 118. The adhesive layer 118 may be configured to bond the layers of material comprising the rear cover 300 together. In particular, the adhesive layer 118 may bond to the outer layer 104 and the inner layer 102 with the speaker cover 116 bonded between the adhesive layer and the inner layer.

The front flap 200 may include inner and outer adhesive layers 120, 122 that bond the layers of material defining the front flap together. In particular, the outer adhesive layer 120 may bond the outer layer 104 to the reinforcement bar 114 and the panels 106 and the end panel 108. Further, the inner adhesive layer 120 may bond the inner layer 102 to the reinforcement bar 114, the panels 106, and the end panel 112. Accordingly, the adhesive layers 118, 120, 122 may laminate the layers and components comprising the front flap 200 and the rear cover 300 of the accessory unit 100 together.

In some embodiments the adhesive layers 118, 120, 122 may comprise a thermoplastic adhesive, such as a thermoplastic urethane adhesive, or a thermoplastic nylon adhesive. Such thermoplastic adhesives may act to form a structural element providing shape to inner layer 102 and outer layer 104 which on their own would not hold a solid shape. In this regard, thermoplastic adhesives may be melted in order to glue together multiple layers of material (e.g., inner layer 102 and outer layer 104). By varying the temperature at which the thermoplastic adhesives are heated, the pressure at which the operation takes place, the length of time the thermoplastic adhesives are exposed to the heat, and the temperature to which the thermoplastic adhesives are cooled after heating, the rigidity of the structure defined thereby may be controlled. For example, in one embodiment as the thermoplastic adhesive melts, it seeps into adjacent porous layers of material, forming a bonded structure. Longer periods of heating result in increased infusion into the material and can create a more rigid structure. One set of trials used a thermoplastic nylon adhesive of about 10 mm in thickness. In that trial a heating cycle performed at between 150 and 200 degrees Celsius for 1-2 minutes followed by a cooling cycle at between 5 and 15 degrees Celsius for 2-3 minutes achieved desirable results. The shape and stability of the structural element can be further improved by subjecting the rear cover to a subsequent heating and cooling process at less extreme temperatures, thereby allowing any residual stresses to be removed.

Figure 3B:
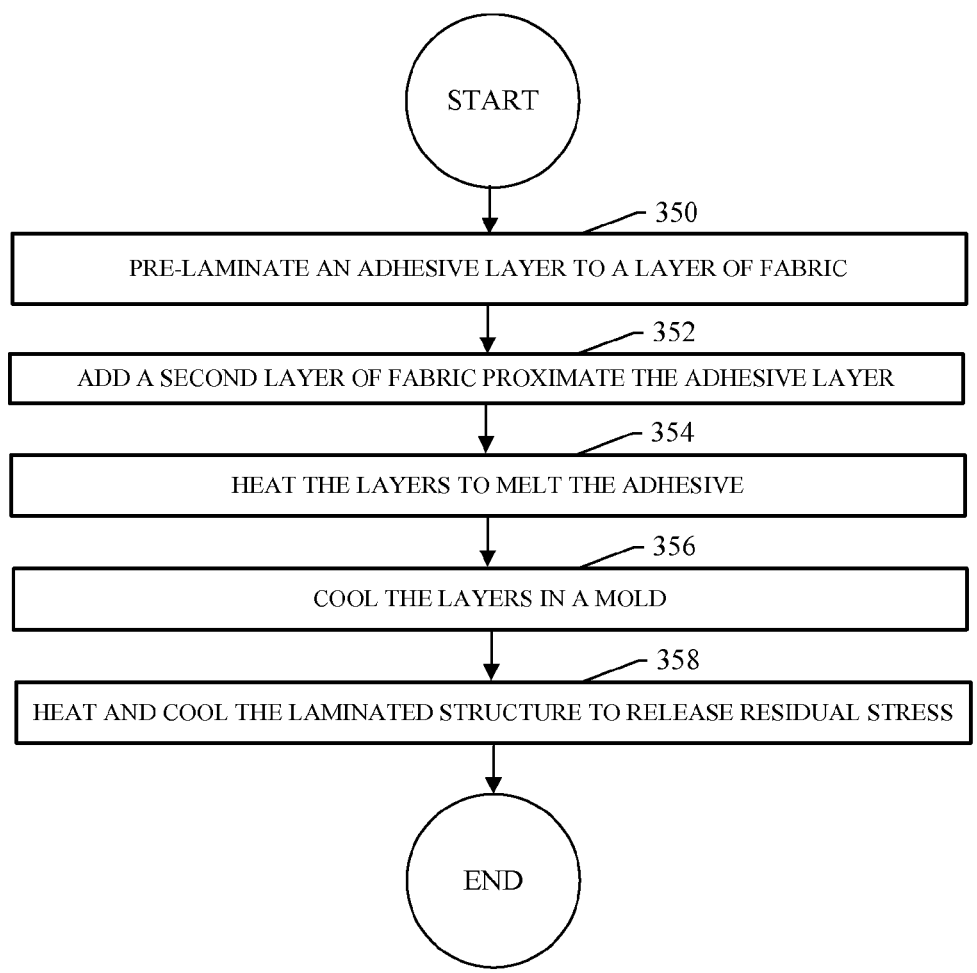

In this regard, the adhesive layer 118 in the rear cover 300 may comprise a thermoplastic adhesive that is melted in order to glue together multiple layers of material (e.g., inner layer 102 and outer layer 104) and provide structure to the rear cover. The particular process employed to use a thermoplastic adhesive as a structural element may vary. However, FIG. 3B illustrates an example embodiment of the steps involved in employing an adhesive to form a structural element. In this regard, as illustrated, the method may include pre-laminating an adhesive layer to a layer of fabric at operation 350. For example, the adhesive layer 118 may be pre-laminated to the inner layer 102 of material. In one embodiment, the adhesive layer can be formed of thermoplastic adhesive such as thermoplastic nylon that forms a thermoplastic nylon adhesive layer applied at a thickness of about 10 mm. Pre-laminating the adhesive layer to the layer of fabric may be employed to properly position the adhesive layer with respect to the fabric layer such that misalignment between the layers is avoided in later steps.

After pre-laminating the adhesive layer to the layer of fabric at operation 350, the method may further comprise adding a second layer of fabric proximate the adhesive layer at operation 352. Thereby, the adhesive layer may be sandwiched between two layers of fabric. Thereafter the method may include heating the layers of material at operation 354. This operation may melt the adhesive layer such the adhesive layer seeps into the fabric layers, forming a bonded structure. The heated layers of material may then be cooled in a mold at operation 356. By cooling the layers of material while in a mold, the layers of material may take a shape defined by the mold. For example, the mold may include positive and negative portions (e.g., a protrusion and an indentation) that combine to form the shape of the recessed portion 302 of the rear cover 300. Note that a mold may also be employed during heating the layers at operation 354. By varying the pressure, time, and/or temperature to which the layers of material are exposed, the properties of the resulting laminated structure may be controlled. For example, a more rigid structure may be formed by heating the layers of material for a longer period of time or to a higher temperature. Conversely, a relatively less rigid structure may be formed by decreasing the temperature and/or time of heating, such that the adhesive seeps into the fabric layers less. For example, in one embodiment, the rear cover outer layer and rear cover inner layer are pressed together in a mold which forms the ultimate shape of the rear cover while heating the rear cover to a temperature between 150 and 200 degrees Celsius at which temperature the glue can properly cure. In other embodiments the heated mold could be replaced by other forms of heating, such as laser heating, which could selectively heat and cure portions of the glue without applying potentially damaging heat to the entire product. It should be noted that the rear cover can be quickly cooled to stabilize the shape formed by the mold. However, the rear cover can also be subjected to longer heating and cooling operations which allow residual stresses from the rapid heating and cooling processes to be removed, thereby stabilizing the shape and durability of the structural member.

Heating the layers at operation 354 and cooling the layers at operation 356 may result in a laminated structure having residual stresses. In order to alleviate these stresses, the laminated structure may be slowly heated and then slowly cooled to release the residual stresses at operation 358. These temperatures may be relatively less than those employed in heating and cooling the layers at operations 354 and 356. Accordingly, embodiments of a relatively rigid recessed portion 302 may be created in accordance with the above-described method from relatively non-rigid layers of material (i.e., an adhesive layer and two layers of fabric material).

However, in some embodiments the accessory unit 100 may include features configured to retain flexibility of the end region 206 of the front flap 200. In this regard, in the embodiment of the accessory unit 100 illustrated in FIG. 3A, the inner and outer adhesive layers 120, 122 of the front flap 200 may not completely cover the end region 206. Rather, as illustrated, the inner and outer adhesive layers 120, 122 may include tabs 120', 122' that extend across the end region 206 proximate the side edges 210a,b of the front flap 200. In particular, the tabs 120', 122' may be configured to extend across the end region 206 of the front flap 200 to the edge of the rear cover 300. Accordingly, in embodiments in which the front flap 200 includes multiple layers of material, the layers of the material may be bonded at first and second longitudinal ends 206a,b of the end region 206 and decoupled therebetween due to the inner and outer adhesive layers 120, 122 defining tabs 120', 122' that bond the longitudinal ends of the end region. By bonding only a portion of the end region 206, the inner layer 102 and the outer layer 104 may remain free to pivot with respect to each other. Thus, the end region 206 may function as a hinge as previously described.

Frame 304 can provide structural integrity to accessory unit 100. In one embodiment, frame 304 can take the form of a robust and lightweight support structure having a multi-sided cross section and an overall shape of a perimeter of chamber 310. Frame 304 can be formed of many materials. In the described embodiments, frame 304 can be formed primarily of Glass Fiber Reinforced Plastic (GFRP) that is also referred to as more simply fiberglass. GFRP is a fiber reinforced polymer made of a plastic matrix reinforced by fine fibers of glass. It should be noted that the plastic matrix used to form many GFRP structures can be a thermosetting plastic (most often epoxy, polyester or vinyl ester) or thermoplastic. Moreover, GFRP is a lightweight, extremely strong, and robust material and has bulk strength and weight properties that compare favorably to metals and yet, unlike metals, is RF transparent. In this way, GFRP has properties that make it a good candidate for a structural element that is strong, resilient and yet is also RF transparent. This combination is particularly desirable when accessory unit 100 is used in conjunction with consumer electronic products that use RF communication circuitry.

When used as a structural element, the material that goes into forming frame 304 has to provide frame 304 with mechanical properties sufficient to securely retain the consumer electronic device within chamber 310 of rear cover 300 of accessory device 100. Moreover, in addition to the ability to retain the consumer electronic product within chamber 310, frame 304 must also retain enough flexibility to allow the consumer electronic device to be inserted and removed from chamber 310 numerous times without undue exertion by an end-user or potentially damaging accessory unit 100 or the consumer electronic product. However, typical configurations of glass fibers within the plastic matrix that form the basis for conventional GFRP material do not generally possess the requisite structural properties suitable for frame 304 under these conditions.

Therefore, in one embodiment, frame 304 can be formed with both conventional GFRP material (plastic matrix and glass fibers) but also a reinforcing agent selectively added to the GFRP material of frame 304 to increase the overall strength and rigidity of frame 304. For example, even though conventional GFRP material does not possess the desired mechanical properties at a thickness suitable for use with accessory device 100, a selected portion of frame 304 can be associated with the reinforcing agent. The reinforcing agent can be a material having a higher modulus of elasticity than the GFRP material that can also be integrally formed with the plastic matrix and glass fibers. One such material that can be used as the reinforcing agent is carbon fiber. In this way, frame 304 can be configured in such a way that portion of frame 304 can be infused with carbon fibers to take the form of carbon-fiber-reinforced polymer (or plastic) also referred to as CFRP, whereas a remaining portion can remain essentially GFRP. Since CFRP is a very strong and light, it is well suited as a reinforcing agent. However, carbon fiber is also conductive and is essentially RF opaque or at the very least adversely affects the ability of any RF component within the consumer electronic product from efficiently receiving or transmitting RF energy. This adverse impact on RF transmissivity is one reason (high cost being another) that prevents carbon fiber from being used to build the entire frame 304 as a frame made completely of carbon fiber would severely attenuate any RF communications to/from the consumer electronic device. Therefore, in order to preserve the RF communication ability of consumer electronics device and provide the requisite structural support, only a portion of frame 304 away from any RF antennae are associated with reinforcing agent in the form of carbon fiber. However, in order to optimize the desired mechanical properties of the combination of carbon fiber and frame 304 formed of GFRP, the carbon fiber is generally incorporated into the plastic matrix of the GFRP that goes into forming frame 304 in a manner described below with regards to FIGS. 4A-4F.

Figure 4A:
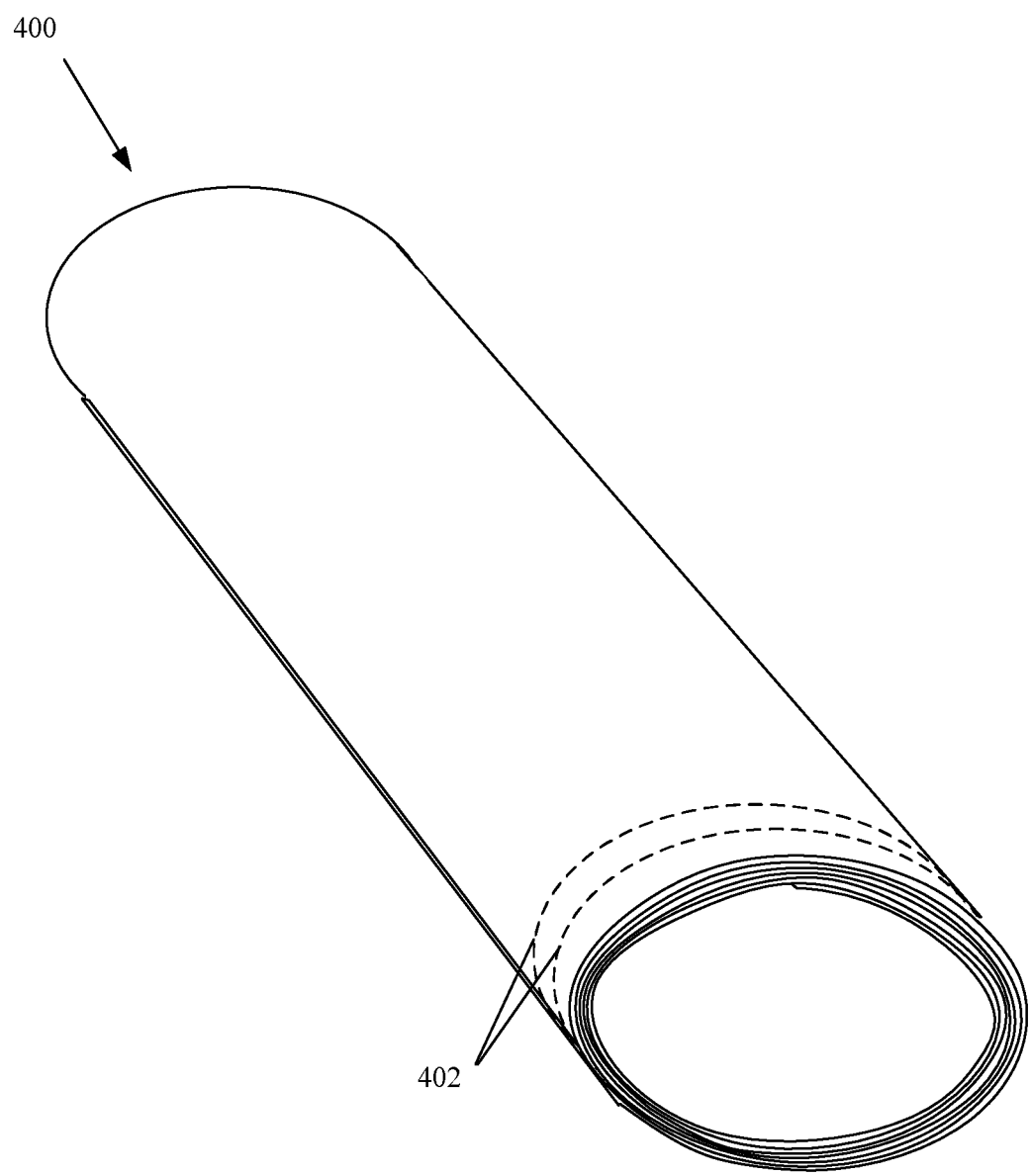
FIG. 4A illustrates a rolled up glass fiber reinforced plastic sheet ready to be sliced into glass fiber reinforced plastic hoops.

FIGS. 4A-4F illustrates a process by which frame 304 can be constructed. Frame 304 is made up of primarily GFRP. The GFRP material described above can also include an inhibitor which prevents it from setting until it achieves a specific temperature. As a result, before being heated at room temperature it has a taffy-like consistency and is highly malleable. Once heated to a temperature of about 150 degrees Celsius and cooled down it hardens into a somewhat flexible solid. FIG. 4A shows how the GFRP portion of the frame is initially formed. GFRP Sheet 400 having a thickness of about 20 glass fibers is rolled up as shown in FIG. 4A. GFRP Sheet 400 can be wrapped around a drum in some cases to ensure the layers of GFRP Sheet 400 are wound tightly. The fibers in GFRP Sheet 400 are unidirectional and all run in a direction parallel to dashed planes 402. GFRP Sheet 400 can be rolled until the roll is between 20 and 30 layers of fiber thick. After tightly rolling GFRP sheet 400, it can then be cut into hoops by cutting along planes 402, also parallel to the direction of the fibers resulting in a minimized number of glass fiber strands being severed. By making thin cuts, parallel to the direct of the fiber along rolled up GFRP Sheet 400 a number of hoops can be produced which have between 20 and 30 layers of glass fiber wrapped in a continuous circle.

Figure 4B:
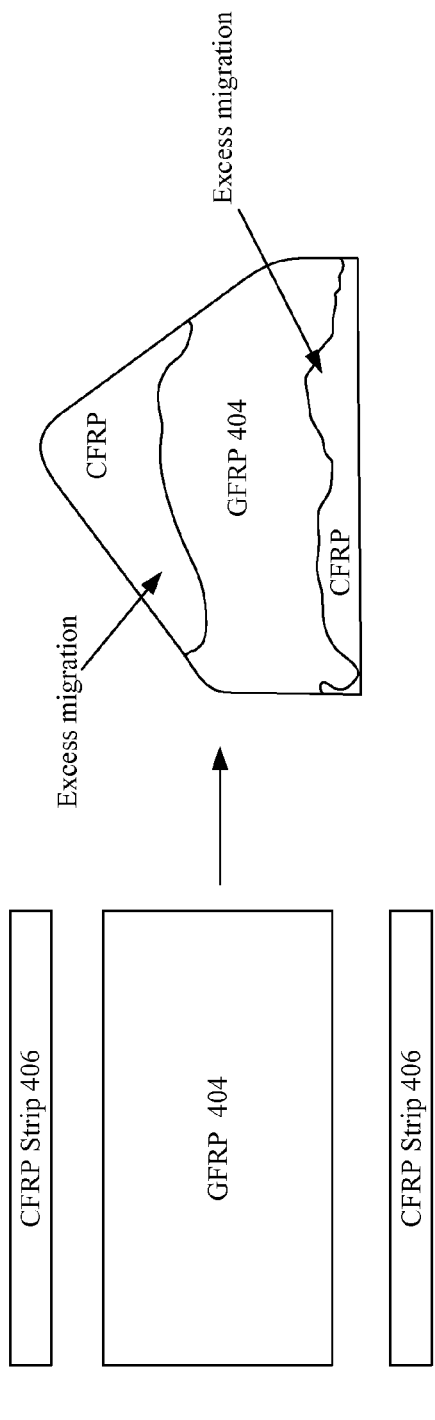
FIGS. 4B & 4C illustrate the positive effect obtained by adding glass scrim fabric between a glass fiber reinforced plastic hoop and carbon fiber reinforced plastic strips.

FIG. 4B illustrates a cross section of GFRP hoop 404. GFRP hoop 404 has a rectangular cross section as can be seen in the figure. Carbon Fiber Reinforced Plastic (CFRP) strip 406 can be die-cut from a thin sheet of carbon fiber reinforced plastic. The sheet of CFRP can be of a thickness of between 0.05 mm and 0.5 mm depending on the ultimate stiffness desired. In this particular embodiment a thickness of about 0.1 mm can be used. Since GFRP has a taffy-like or sticky consistency once CFRP strips 406 are placed on both the bottom and top surfaces of GFRP Hoop 404 they will naturally adhere to it. This can be precisely accomplished by placing one side of GFRP Hoop 404 into a straightening tool, which straightens one side of the hoop into its ultimate length while CFRP strips 406 are adhered on both a top and bottom side of GFRP Hoop 404. Once CFRP 406 is attached to GFRP Hoop 404 it can be placed in a mold for thermosetting. When the materials are set together they form a fused composite of GFRP and CFRP as can be seen in the two cross sectional snapshots shown in FIG. 4B. Unfortunately, since the material substantially liquefies during the thermosetting process a significant amount of undesirable fiber migration can occur between the two materials. This results in varying stiffness along the carbon reinforced portion of frame 304. As can be seen in the two cross-sectional cuts the migration patterns are not even uniform along the length of a single frame. Therefore, a method for reducing migration should be introduced.

Figure 4C:
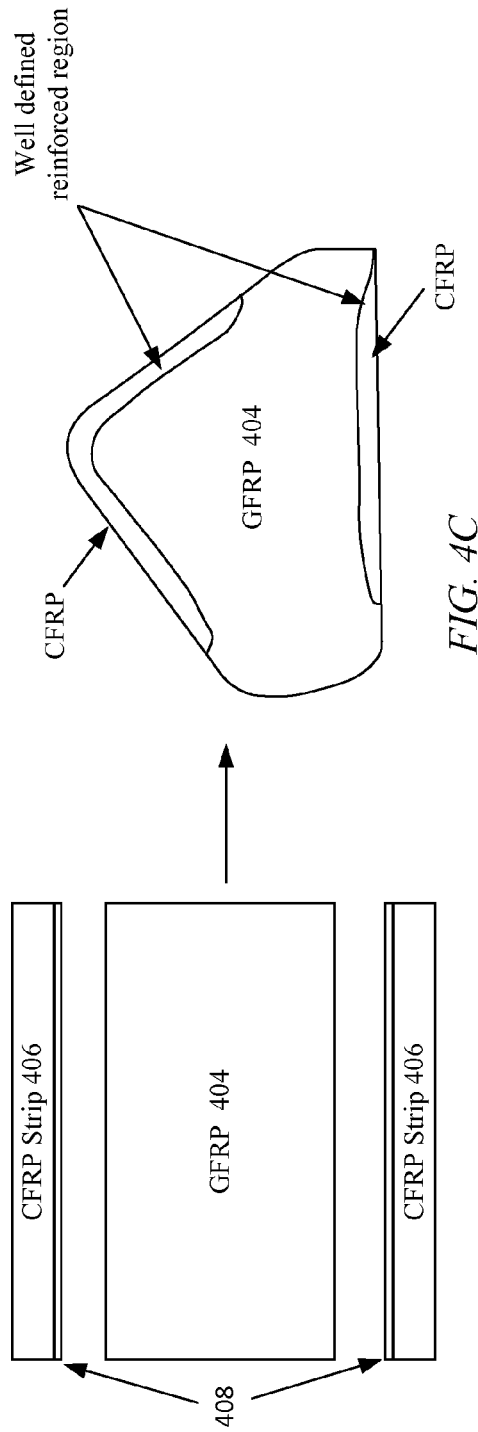

FIG. 4C shows one solution to the migration problem. Before CFRP strips 406 are attached to GFRP Hoop 404, they are first attached to glass scrim fabric 408. Glass scrim fabric 408 is a thin sheet of glass fiber fabric with fibers woven in a different direction than those found in GFRP Hoop 404. In this way the fibers from GFRP Hoop 404 and CFRP Strips 406 can be substantially prevented from migrating. The results can be seen in FIG. 4C. The CFRP Strips 406 remains densely positioned along the top and bottom sides of resulting frame structure 304. By having dense sections of carbon fiber at the extreme top and bottom of frame 304 the moment of inertia of the structure can be enhanced. This structure functions in much the same way as a steel I-Beam concentrating the stiff portions of the frame at the top and bottom. Another major advantage of using carbon fiber is that its stiffness can vary dramatically based on the type and grade of precursor used to form it. While standard grades start at a modulus of about 230 GPa, the modulus used in this embodiment was about 377 GPa.

Figure 4D:
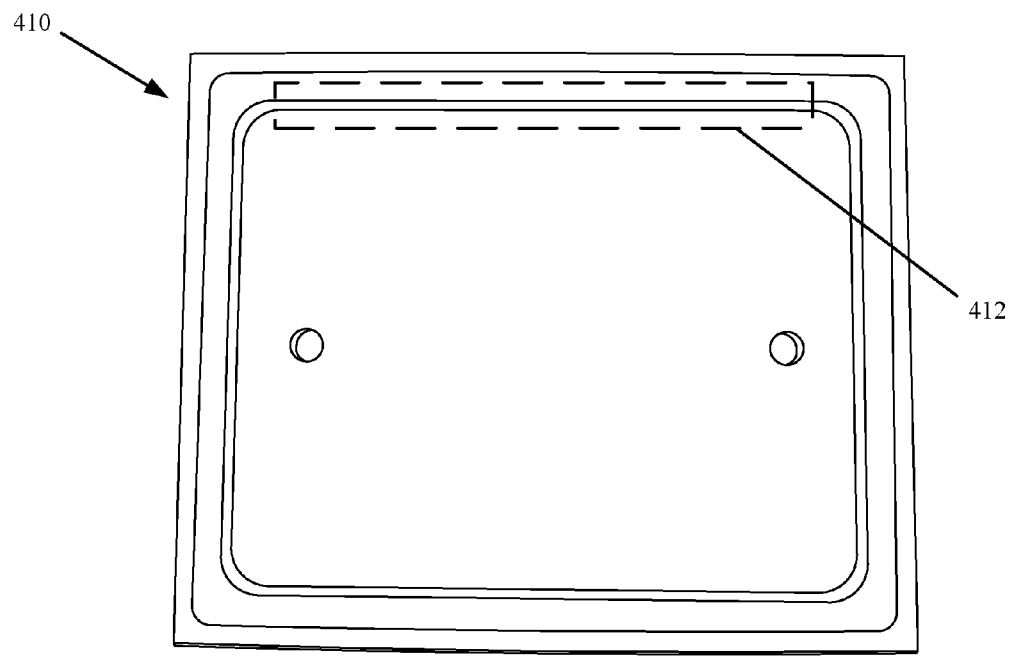
FIGS. 4D & 4E illustrate how the mold cavity forms and sets the frame.
Figure 4E:
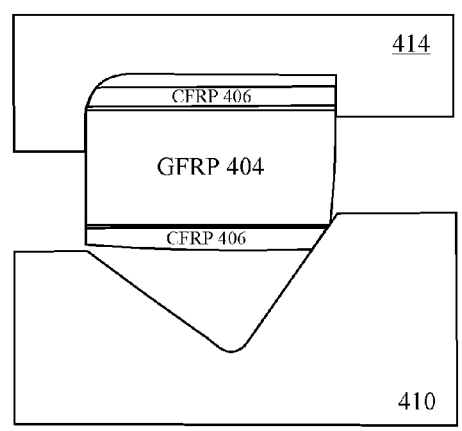

FIGS. 4D and 4E illustrate the mold for heating and setting frame 304. Mold 410 is designed to heat and shape GFRP Hoop 404 into frame 304 along while fusing CFRP Strips 406 to the top and bottom of GFRP Hoop 404 in mold portion 412. As previously described CFRP Strips 406 are already positioned and stuck to GFRP Hoop 404; therefore straightened portion of GFRP Hoop 404 with attached CFRP Strips 406 can be easily positioned into mold portion 412 of mold 410. Mold 410 includes a heating system which increases the temperature and malleability of the hoop, further easing the process of fitting the rest of the hoop into mold cavity 410. FIG. 4E shows a cross section of one portion of the mold in mold portion 412. Upper mold portion 414 is then pressed down upon the mold giving frame 304 its ultimate shape. Once frame 304 is allowed to cool, and any excess flashing is removed, frame 304 is fully formed.

Figure 4F:
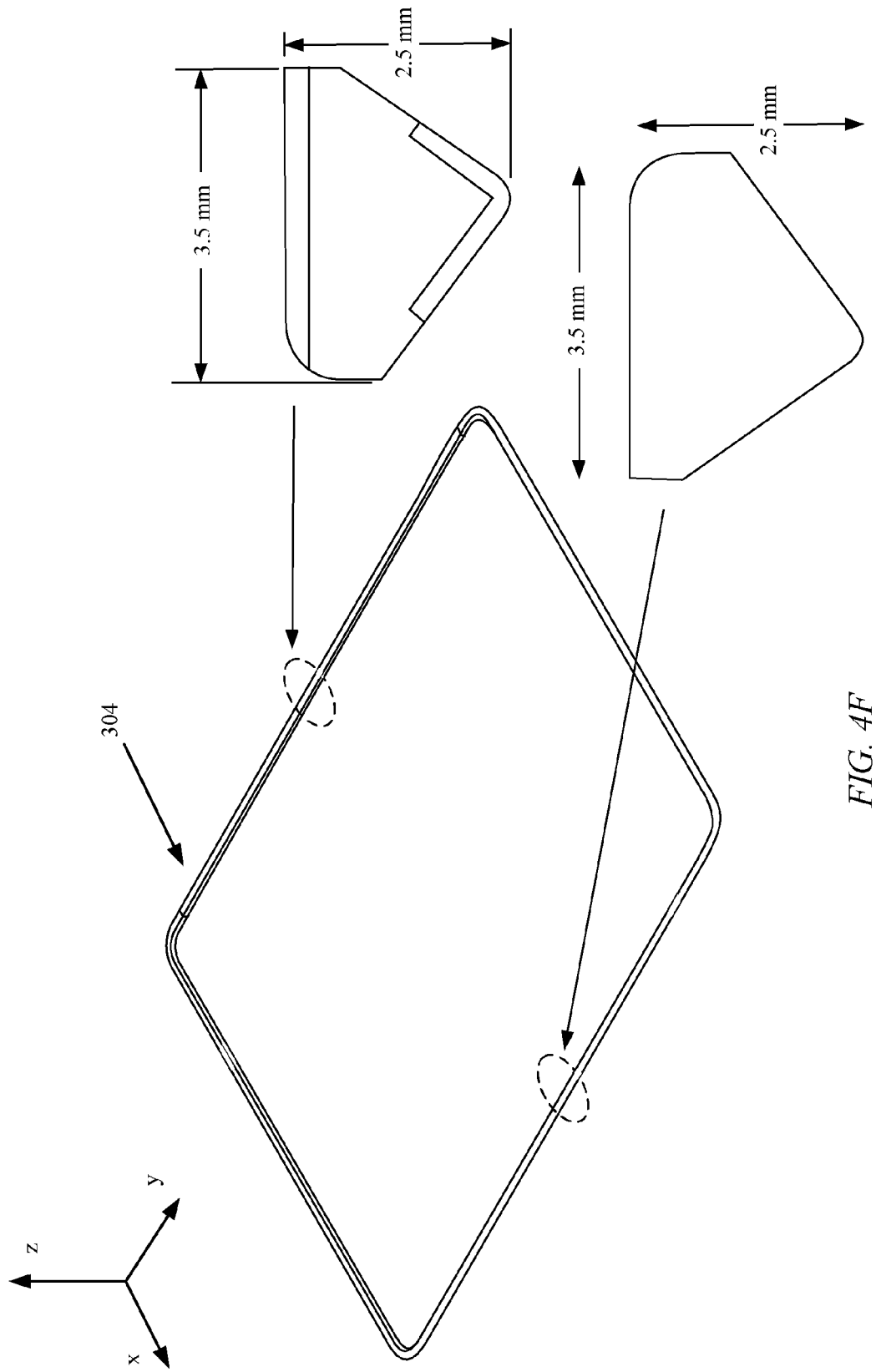
FIG. 4F illustrates a perspective view of a frame of the rear cover of the accessory unit of FIG. 1A and cross-sectional views through the frame.

FIG. 4F shows a perspective view of finished frame 304. The result is a GFRP frame with a single side reinforced by carbon fiber. This solution removes any need for a mechanical coupling, as the two materials are fused tightly together due to the interaction of the resin during the setting process. In this way the glass fibers can run continuously around the entire loop, and the carbon fibers lie on the top and bottom portions of the frame, resisting any bending motions applied in the y-z plane. Beneficially, since the carbon fibers do not cover the lateral sides of the frame, motion in the x-z plane is only incidentally affected, easing the removal of the consumer electronic device. While this technique has been described in the context of stiffening one edge of the frame of an accessory device it should be noted that it could be applicable over a large range of applications. Any application that requires portions of varying stiffness could greatly benefit from this combination of glass and carbon fiber composite. This configuration even allows a designer to pick which directions to stiffen.

Figure 4G:
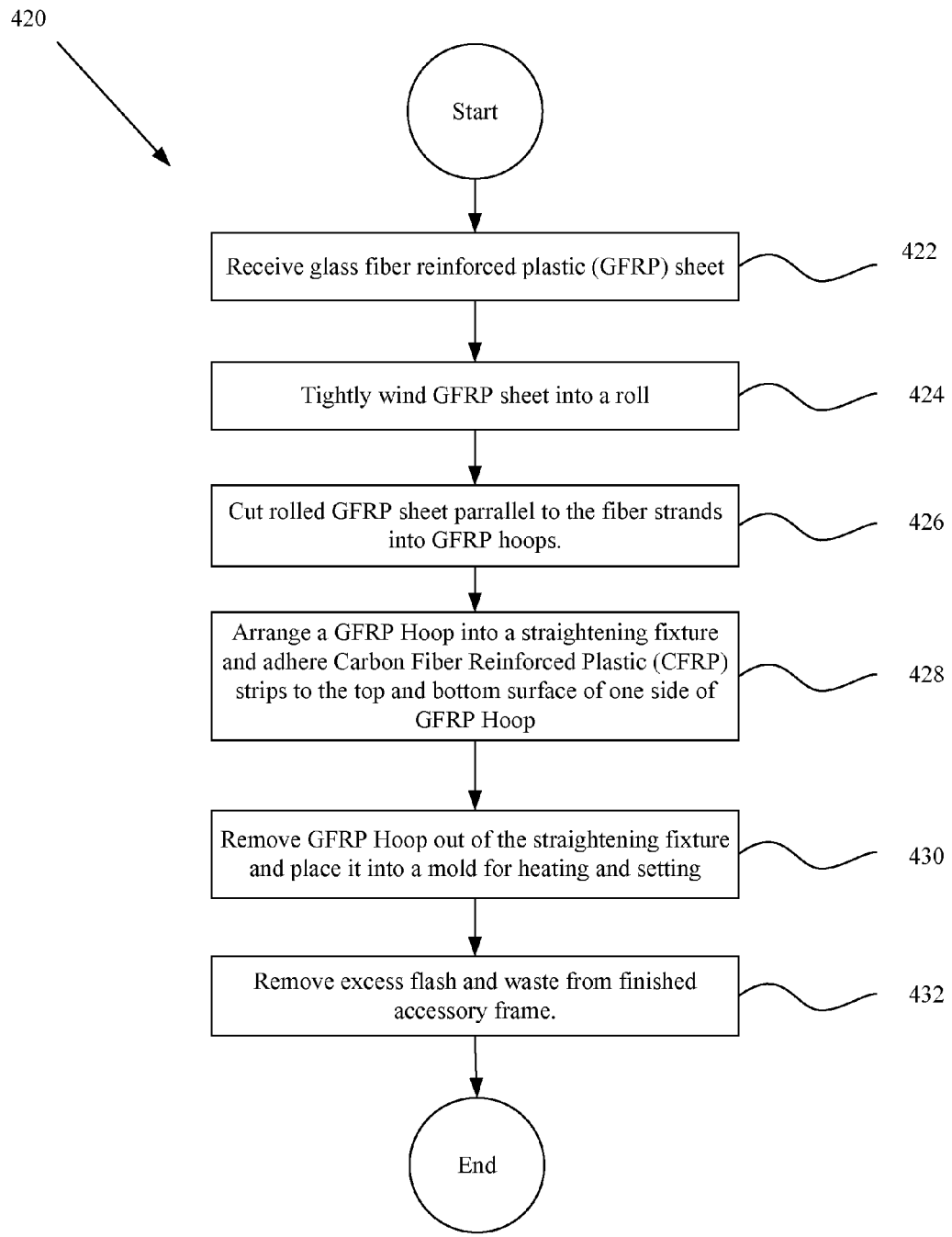
FIG. 4G is a block diagram describing a process for creating a frame for the rear cover of the accessory unit of FIG. 1A.

FIG. 4G shows flow chart 420 in which the frame creation process is summarized. In a first step 422 a Glass Fiber Reinforced Plastic (GFRP) sheet is received. In a second step 424 the GFRP Sheet is tightly wound to a thickness of between 20 and 30 layers. A drum may be used to wrap the GFRP around to increase the tightness of the wrap. After the wrapping process is complete in step 426 the GFRP Sheet is cut thinly curt along the direction of the glass fibers to form thin GFRP Hoops. In a next step 428 a thin GFRP Hoop is placed in a straightening fixture, and two carbon reinforced plastic (CFRP) strips are adhered on a bottom and top surface of one side of the GFRP Hoop. In step 430 the carbon reinforced GFRP Hoop is now removed from the straightening fixture and placed in a mold. The mold heats and sets the carbon reinforced GFRP Hoop. Once complete the CFRP strips are securely fused to the GFRP Hoop in one continuous frame structure. Finally, in step 432 excess flash and waste from the molding process are removed and the frame is complete.

Figure 5:
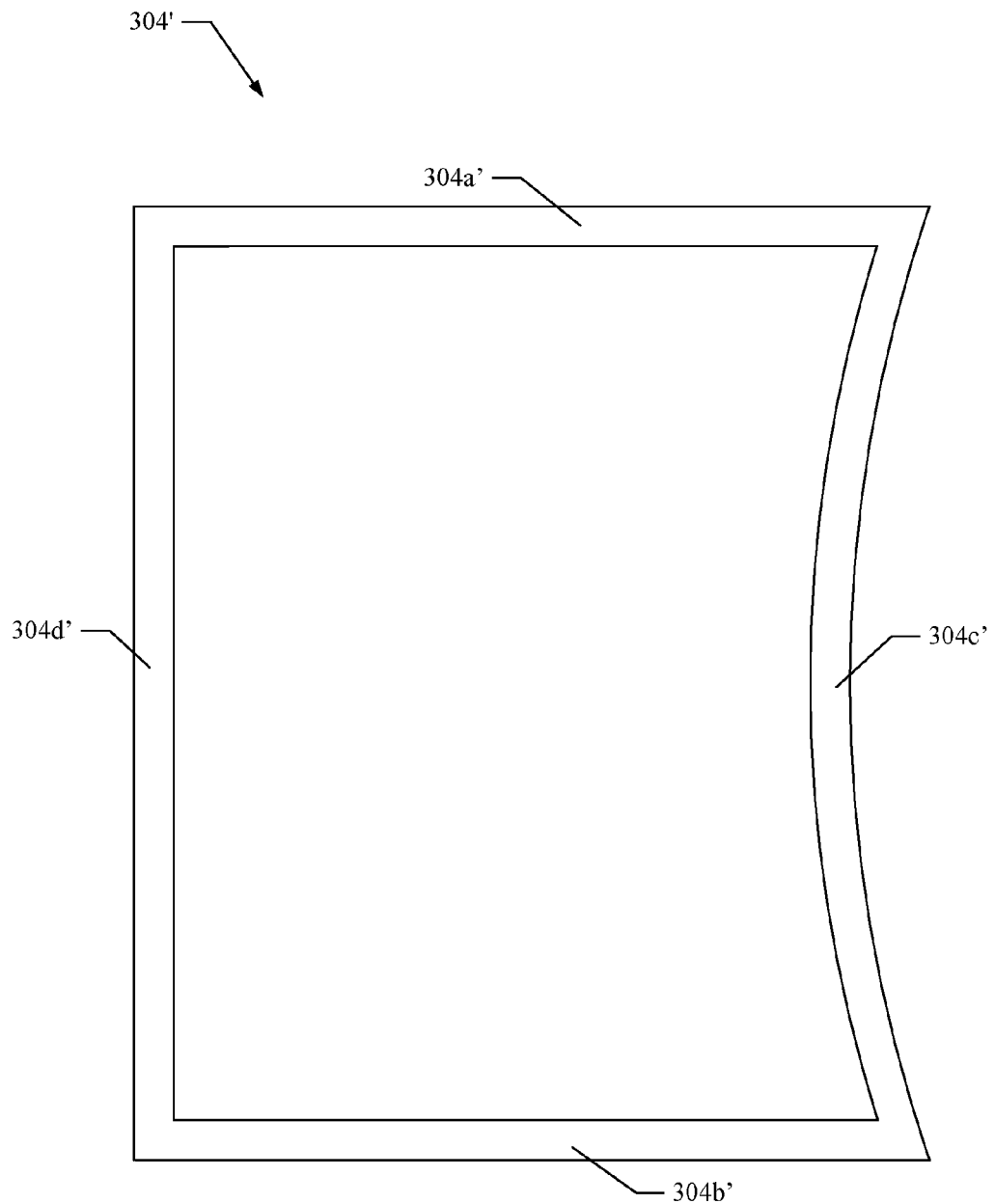
FIG. 5 illustrates a top view of a frame for a rear cover of an accessory unit according to an alternate example embodiment of the present disclosure.

As illustrated in FIG. 1A, the frame 304 includes a plurality of sides 304*a-d* that may define a rectangular configuration in some embodiments. FIG. 5 illustrates a top view of an alternate embodiment of the frame. In the embodiment illustrated in FIG. 5, the frame 304' also includes a plurality of sides 304*a'-d'*. Three of the sides 304*a'*, *b'*, *d'* are substantially similar to the sides 304*a*, *b*, *d* of the embodiment of the frame 304 illustrated in FIG. 1A.

In particular, with reference to FIG. 1A, a first side 304*d* of the frame 304 proximate to the end region 206 of the front flap 200 and the two sides 304*a,b* connected thereto are the same as the sides 304*a'*, *b'*, *d'* of the frame 304' of FIG. 5. However, the fourth side 304*c'* of the frame 304', which is positioned opposite to the first side 304*d'* differs from the fourth side 304*c* of the frame 304 illustrated in FIG. 1A. In this regard, the fourth side 304*c'* of the frame 304' of FIG. 5 defines a bowed configuration. In particular, the fourth side 304*c'* bows inwardly toward the center of the frame 304'. This bowed configuration is configured to apply an inwardly directed force when a consumer electronic device is received in the rear cover such that the forth side of the frame does not sag downwardly.

Figure 6:
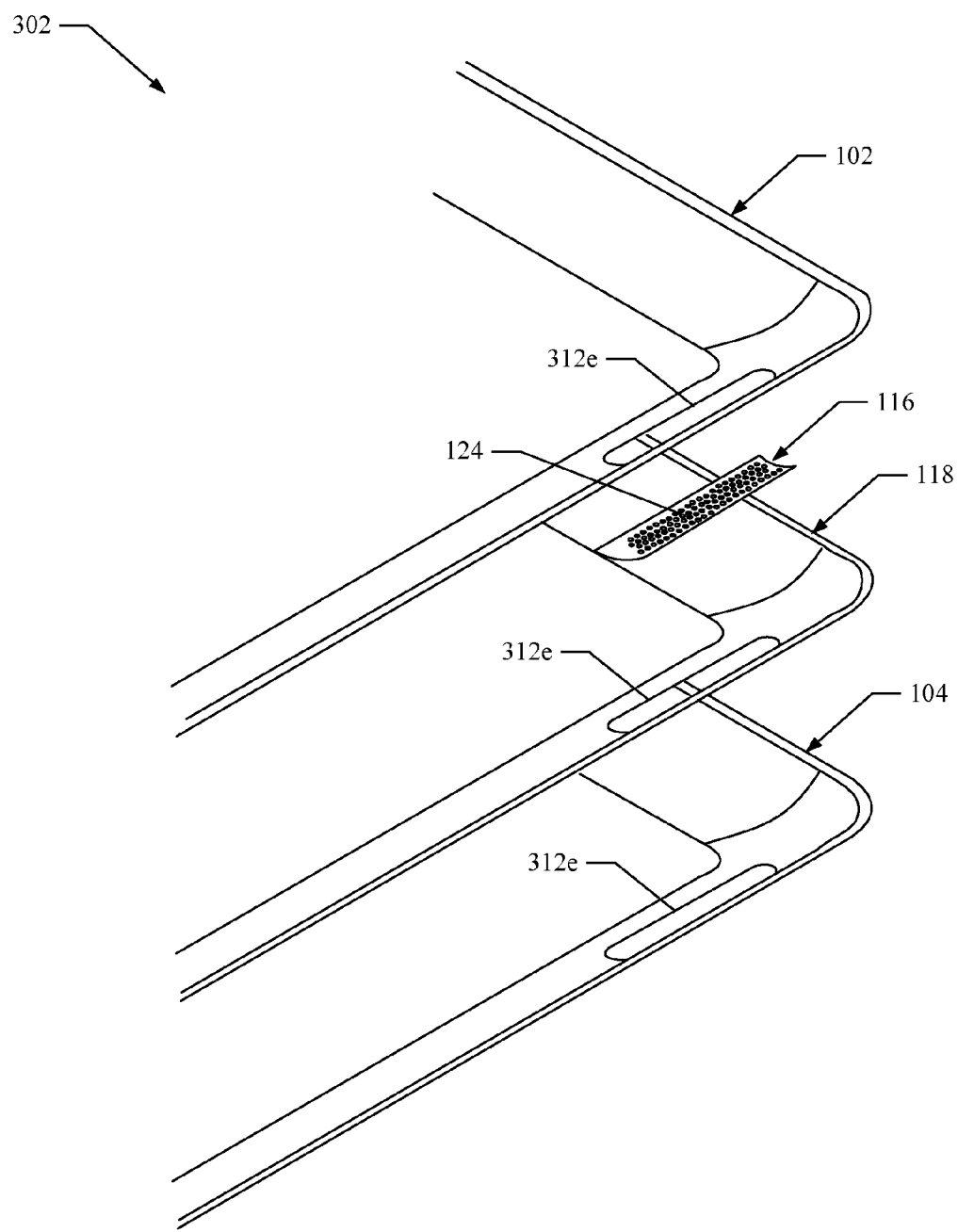
FIG. 6 illustrates a partial enlarged exploded view of the rear cover including a speaker cover.

FIG. 6 illustrates an enlarged exploded view of recessed portion 302 of the rear cover 300. As illustrated, the speaker cover 116 may include a layer of material that is relatively smaller than the other layers of material 102, 104, and 118 defining the rear cover 300. In this regard, the speaker cover 116 may be configured to be slightly larger than the aperture 312*e* which is defined through the remaining layers 102, 104, 118 of the rear cover 300 such that the peripheral edges of the speaker cover 116 are configured to engage the inner layer 102 of the rear cover and the adhesive layer 118. A plurality of apertures 124 may be defined in the speaker cover 116 such that sound waves may travel out of the accessory unit 100 through the apertures 124 in the speaker cover 116 and the aperture 312*e*. In some embodiments the speaker cover 116 may be color matched to the inner layer 102 and/or the outer layer 104 to provide a pleasing aesthetic appearance.

In some embodiments the apertures defined through the rear cover 300 may be formed by laser ablation. In this regard, a laser may remove material from the accessory device 100 to define apertures therethrough. Further, in some embodiments laser ablation may be employed to remove material from a desired partial depth through the accessory device. For example, laser ablation may remove the outer layer 104 of material, while allowing one or more other layers of material comprising the accessory device 100 to remain. For example, by employing layers of material defining differing colors, laser ablation may be employed to remove the outer layer 104 in a pattern that defines a desired design. Accordingly, a pleasing aesthetic effect may be provided without requiring printing on the outer layer 104, which may be less durable.

Figure 7:
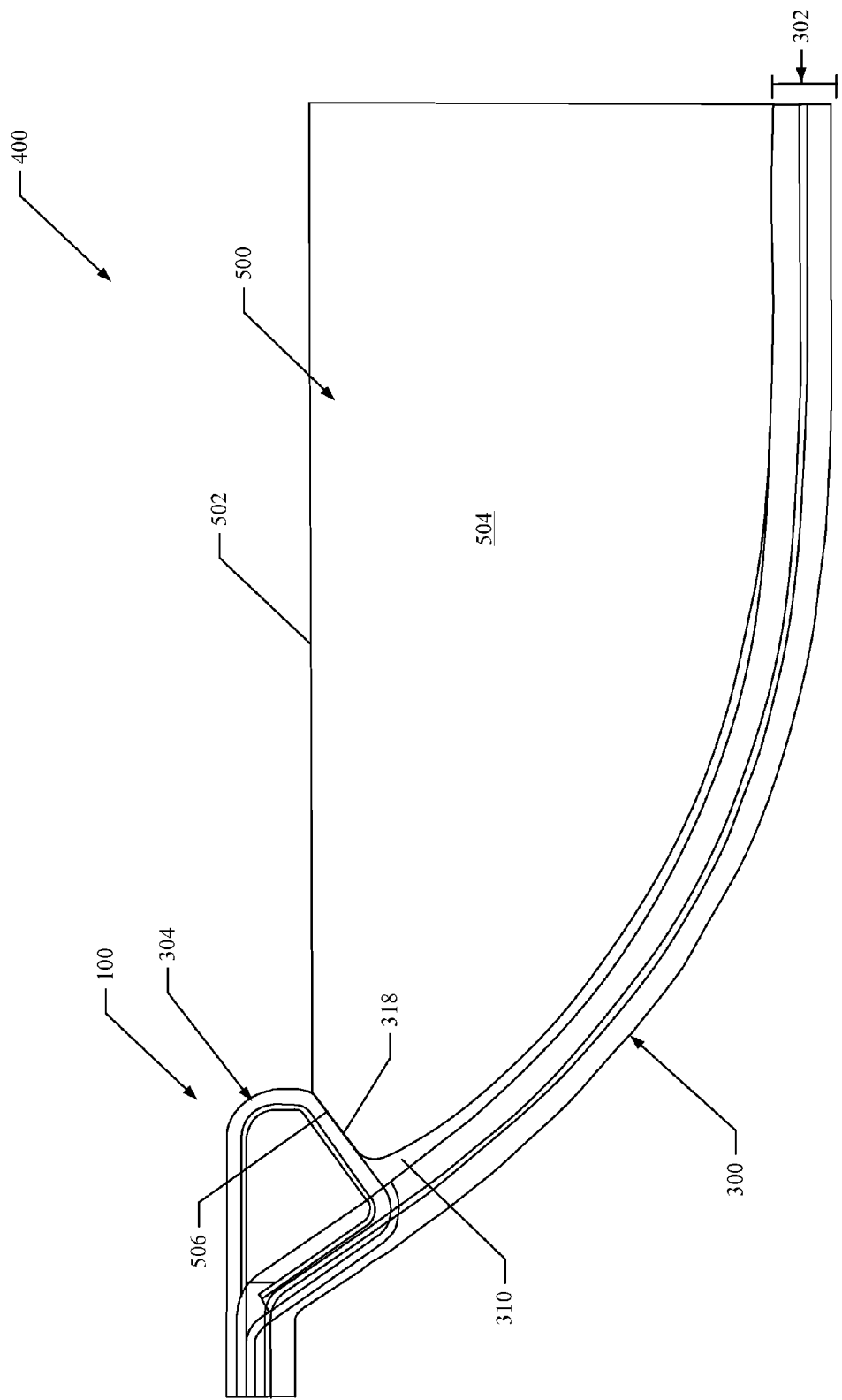
FIG. 7 illustrates a cross-sectional view through an assembly comprising the accessory unit of FIG. 1A and a consumer electronic product according to an example embodiment of the present disclosure.

As noted above, the accessory unit 100 may be configured to hold a consumer electronic device in the chamber 310 defined in the rear cover 300. In this regard, FIG. 7 illustrates an enlarged partial cross-sectional view through an assembly 400 comprising the above-described accessory unit 100 and a consumer electronic device 500. The consumer electronic device may include an iPad™, as produced by Apple, Inc. of Cupertino, Calif. However, the assembly may include other consumer electronic devices in other embodiments.

FIG. 7 illustrates the front flap 200 in the open configuration wherein a display 502 of the consumer electronic device 500 is fully uncovered. However, the front flap 200 may be configurable between a number of positions including open positions in which the display 502 is at least partially uncovered and one or more closed configurations in which the front flap at least partially covers the display. In both the open configurations and the closed configurations, the recessed portion 302 of the rear covers 300 wraps around a housing 504 of the consumer electronic device 500.

The frame 304 of the rear cover 300 may retain the consumer electronic device 500 in the chamber 310. As illustrated in FIG. 7, in one embodiment the frame 304 may define a triangular cross-section. The triangular configuration of the frame 304 allows an inner edge 318 of the frame to engage a chamfered edge 506 of the consumer electronic device 500. Note, however, that the frame 300 may define other cross-sectional shapes that include an inner edge configured to engage a chamfered edge of a consumer electronic product in other embodiments.

Accordingly, the frame 300 may act via interference fit to retain the consumer electronic device 500 in the chamber 310. Further, as illustrated, the frame 300 may substantially avoid contacting the display 502 in this configuration. This allows substantially all of the display 502 to remain visible, which may be desirable in embodiments in which the consumer electronics device includes a display that extends near the edges of the top surface thereof.

Figure 8:
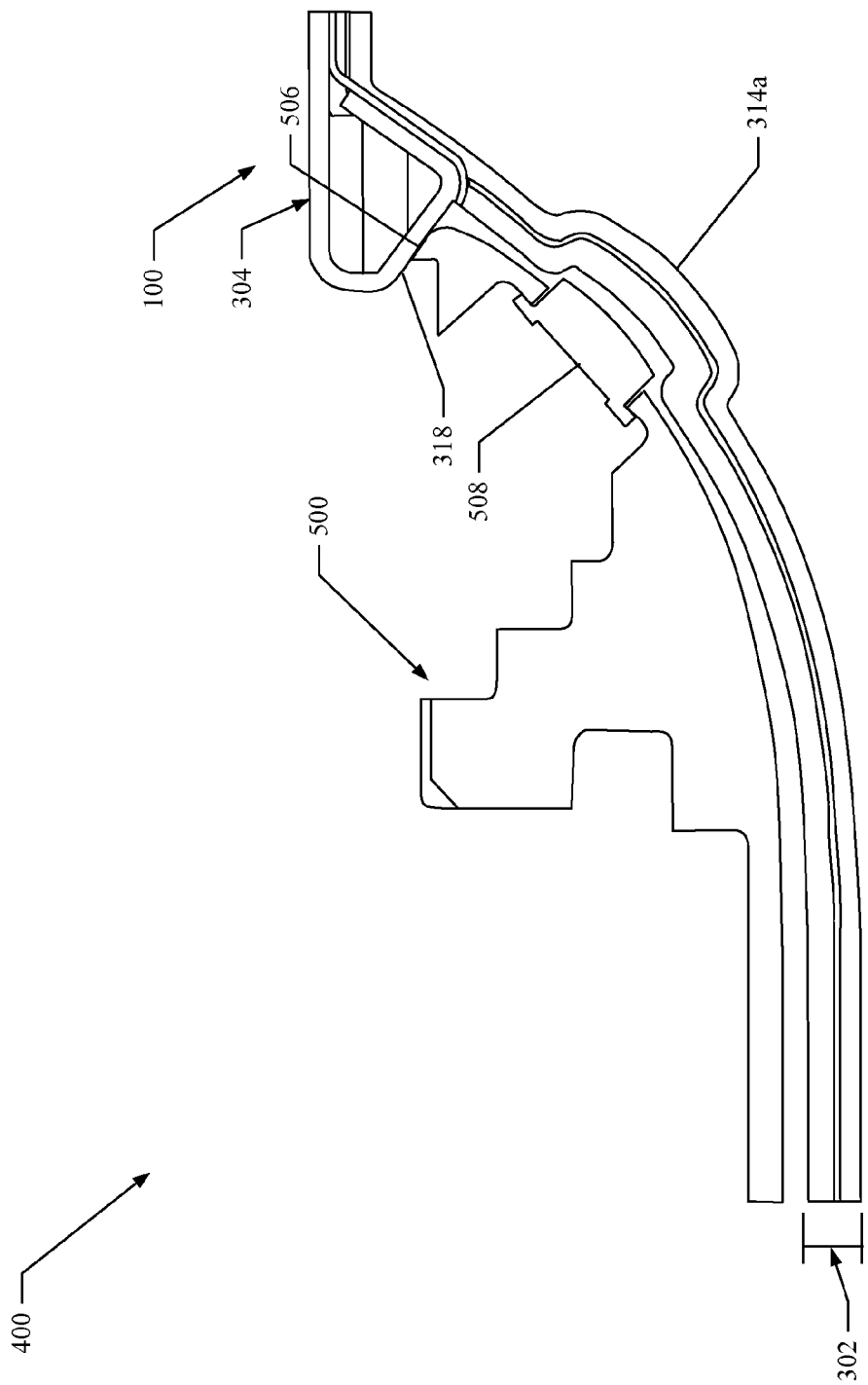
FIG. 8 illustrates a cross-sectional view through the assembly of FIG. 7 at a button of the consumer electronic device an a corresponding embossed portion of the rear cover of the accessory unit.

FIG. 8 illustrates a partial enlarged sectional view through the assembly 400 of FIG. 7. As noted above, the recessed portion 302 of the rear cover 300 may define one or more embossed portions. In this regard, FIG. 8 illustrates an embossed portion 314a aligned with a button 508 of the consumer electronic device 500. In this regard, the embossed portion 508 may allow a user to easily identify the location of the button 508 through tactile feel or visual recognition. Further, since the recessed portion 302 of the rear cover 300 may includes one or more flexible materials, the embossed portion 314a may be depressed or otherwise manipulated to actuate the button 508.

The other embossed portion 314b illustrated in FIG. 1A may be employed for similar purposes with respect to one or more additional buttons on the consumer electronic device 500. Similarly, the apertures 312 may be employed to provide access to various components of the consumer electronic device such as audio, power, and data ports. Further, one of the apertures 312c may be configured to align with a camera lens of the consumer electronic device 500. In this regard, the aperture 312c may be oversized relative to the size of the camera lens in order to ensure that the camera lens is not blocked even when the consumer electronic device is not perfectly aligned in the rear cover 300.

Figure 9:
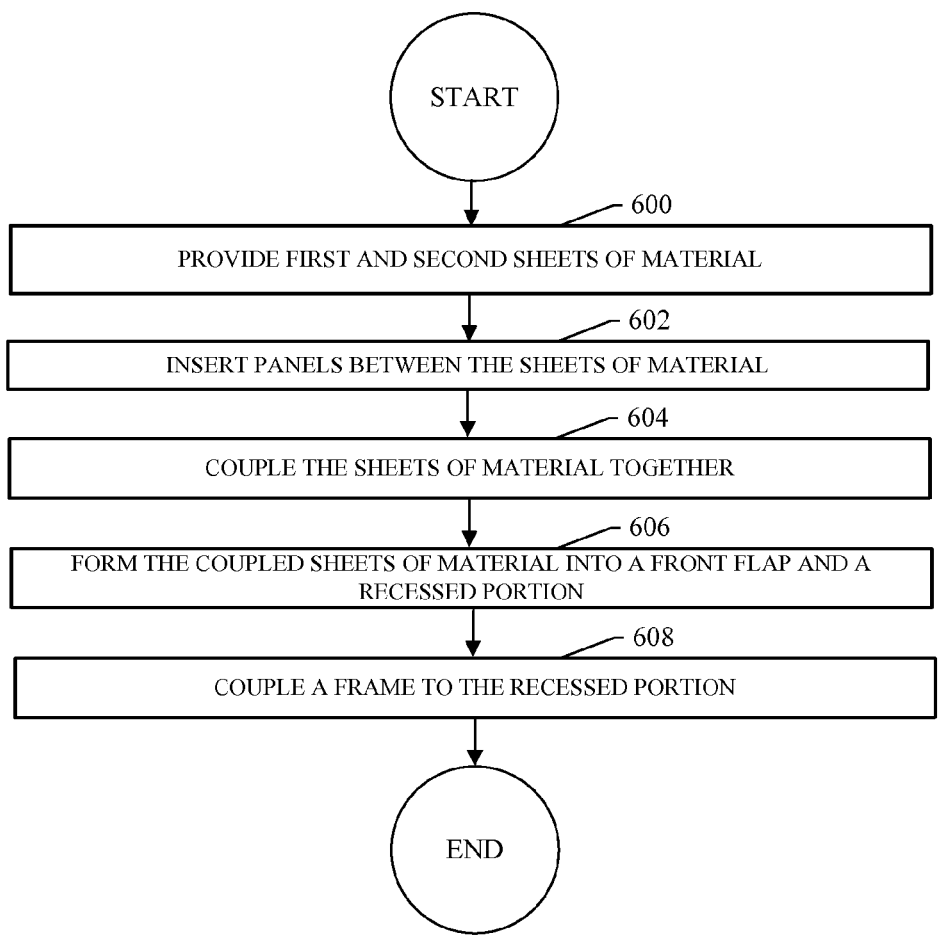
FIG. 9 schematically illustrates a method for manufacturing an accessory unit according to an example embodiment of the present disclosure.

A related method for manufacturing an accessory unit is also provided. As illustrated in FIG. 9, the method may include providing a first sheet of material and a second sheet of material at operation 600 and inserting a plurality of panels between the first sheet of material and the second sheet of material at operation 602. Thereafter, the method may include coupling the first sheet of material to the second sheet of material at operation 604 and forming the first sheet of material and the second sheet of material into a front flap that is substantially planar and a recessed portion that defines a chamber at operation 606. Additionally, the method may include coupling a frame to the recessed portion extending about an opening of the chamber at operation 608.

In some embodiments coupling the sheets of material at operation 604 and forming the forming the sheets of material into a front flap and a recessed portion at operation 606 may be conduction substantially simultaneously. For example, the sheets may be coupled and formed into a front flap and recessed portion via a lamination process. However, these steps may be performed separately in other embodiments. Also, the front flap and the recessed portion may be formed substantially simultaneously in some embodiments or at different times in other embodiments.

The method may further include cutting holes in the recessed portion in some embodiments. Additionally, the method may include inserting a magnetic element between the first sheet of material and the second sheet of material. Inserting the magnetic element may be conducted simultaneously with inserting the panels at operation 602 in some embodiments. In this regard, the magnet element may be coupled to the panel prior to insertion of the panel between the sheets of material.

Figure 10A:
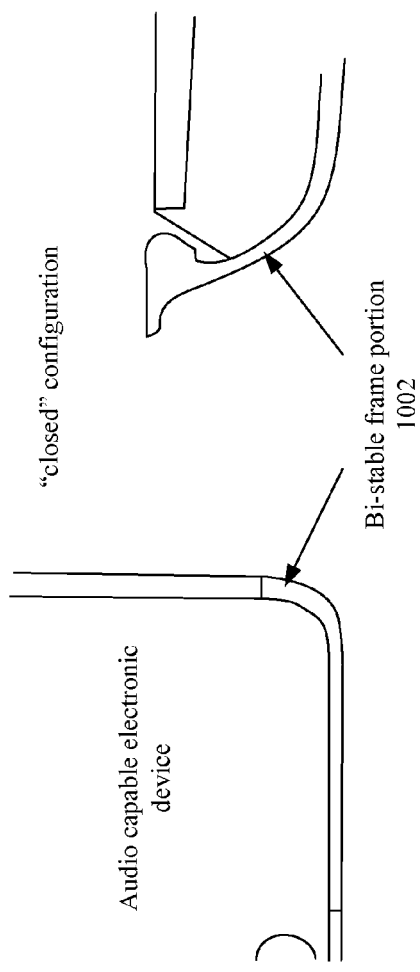
FIGS. 10A and 10B illustrate an embodiment of the accessory unit having a bi-stable frame portion for providing an audio path.
Figure 10B:
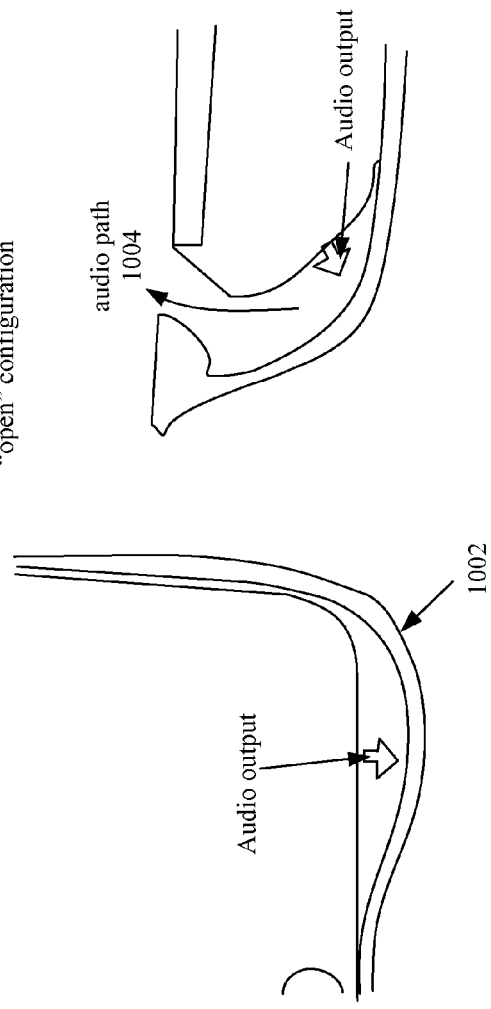

FIGS. 10A and 10B illustrate an embodiment of accessory unit 100 having a bi-stable frame portion for providing an audio path. In those situations where accessory unit 100 is used with an electronic device having audio output capabilities, it may be desirable for at least portion 1002 of frame 304 to be flexible in such a way so as to possess bi-stable configuration. By bi-stable it is meant that in a first configuration shown in FIG. 10A, bi-stable portion 1002 of frame 304 can take on a first, or closed, configuration. In the closed configuration, accessory unit 100 can block substantial amounts of audio energy provided by an audio output device (such as a speaker). Therefore, as shown in FIG. 10B, bi-stable portion 1002 can transition from the closed configuration of FIG. 10A to an open configuration that provides audio path 1004. In this way, audio output provided the by audio output device can be more readily heard by an end-user thereby greatly enhancing the end-user's listening experience.

In another embodiment, illustrated in FIGS. 11A and 11B, another configuration for outputting sound from the accessory device 100 is provided. As illustrated in FIG. 11A, which is a top view of a corner of the rear cover 300, the recessed portion 302 may comprise a cutout portion 320. For example, the cutout portion 320 may be formed by removing the inner layer 102 of material defining the recessed portion 300 via laser ablation in some embodiments. The cutout portion 320 may comprise a main chamber 322 and one or more of channels 324 extending there from toward the frame 304.

FIG. 11B illustrates a cross-sectional view through the rear cover 300 at the cutout portion 320. As illustrated, the channels 324 may extend upwardly toward the frame 304. Further, each channel 324 may align with an aperture 326 in the frame 304. The chamber 322 of the cutout portion 320 may be configured to align with a speaker of a consumer electronic device received in the rear cover 300 such that sound outputted there from travels from the chamber through the channels 324 and upward and out through the apertures 326 in the frame 304. Accordingly, the cutout portion 320 and apertures 326 in the frame may function as an acoustic wave guide that directs sounds out of the rear cover 300 through the front of the accessory device 100 in order to direct the sound at a user.

Figure 12:
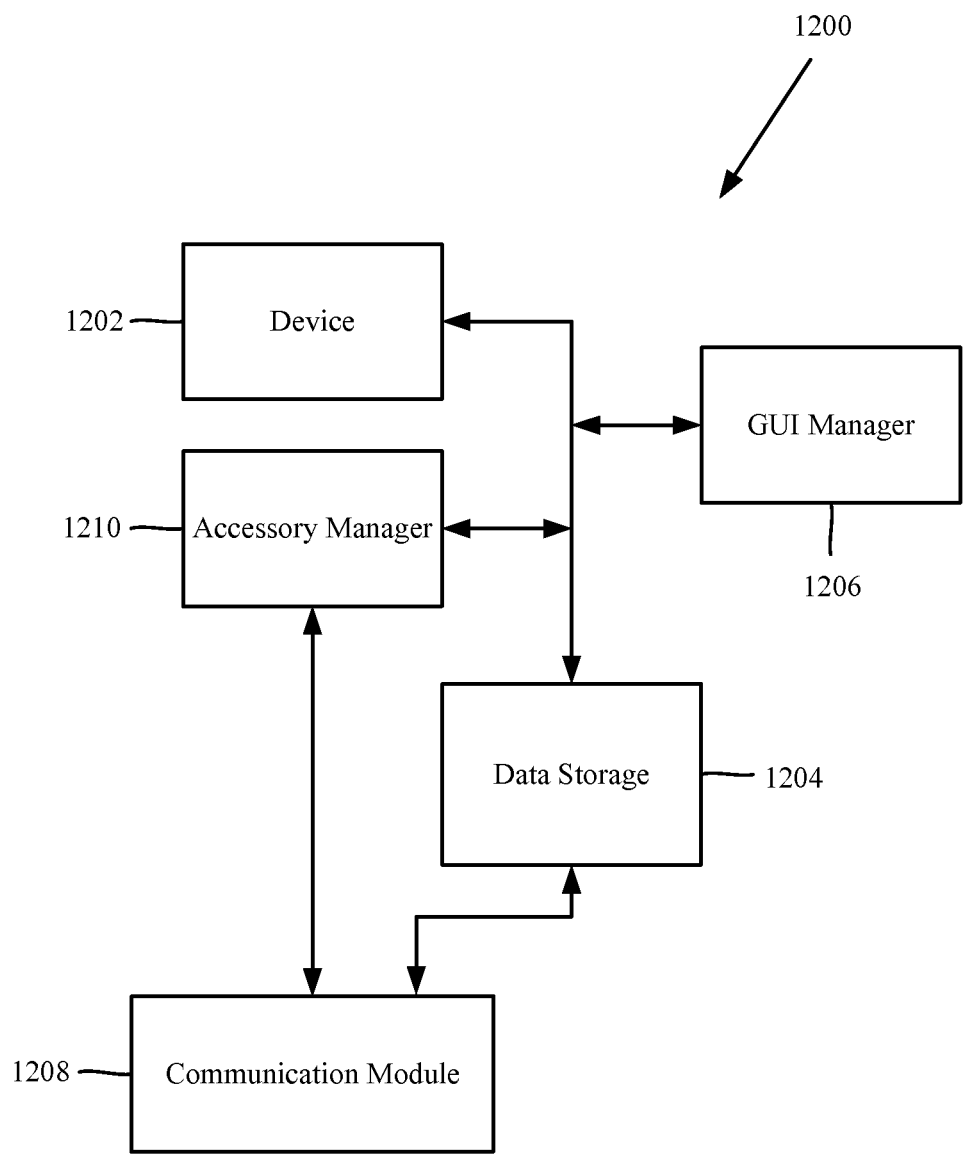
FIG. 12 is a block diagram of an arrangement of functional modules utilized by a portable media device.

FIG. 12 is a block diagram of an arrangement 1200 of functional modules utilized by an electronic device. The electronic device can, for example, be tablet device 100. The arrangement 1200 includes an electronic device 1202 that is able to output media for a user of the portable media device but also store and retrieve data with respect to data storage 1204. The arrangement 1200 also includes a graphical user interface (GUI) manager 1206. The GUI manager 1206 operates to control information being provided to and displayed on a display device. The arrangement 1200 also includes a communication module 1208 that facilitates communication between the portable media device and an accessory device. Still further, the arrangement 1200 includes an accessory manager 1210 that operates to authenticate and acquire data from an accessory device that can be coupled to the portable media device.

Figure 13:
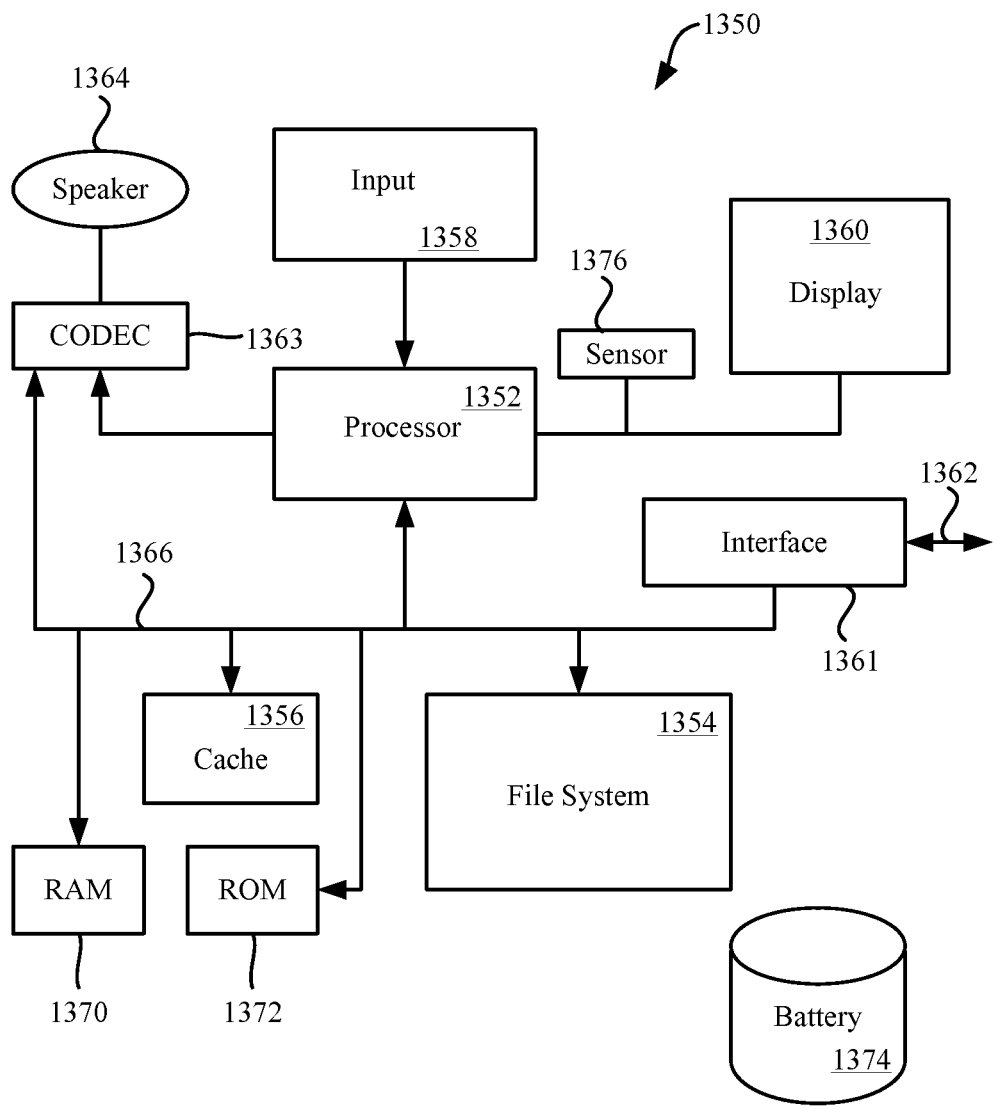
FIG. 13 is a block diagram of an electronic device suitable for use with the described embodiments.

FIG. 13 is a block diagram of an electronic device 1350 suitable for use with the described embodiments. The electronic device 1350 illustrates circuitry of a representative computing device. The electronic device 1350 includes a processor 1352 that pertains to a microprocessor or controller for controlling the overall operation of the electronic device 1350. The electronic device 1350 stores media data pertaining to media items in a file system 1354 and a cache 1356. The file system 1354 is, typically, a storage disk or a plurality of disks. The file system 1354 typically provides high capacity storage capability for the electronic device 1350. However, since the access time to the file system 1354 is relatively slow, the electronic device 1350 can also include a cache 1356. The cache 1356 is, for example, Random-Access Memory (RAM) provided by semiconductor memory. The relative access time to the cache 1356 is substantially shorter than for the file system 1354. However, the cache 1356 does not have the large storage capacity of the file system 1354. Further, the file system 1354, when active, consumes more power than does the cache 1356. The power consumption is often a concern when the electronic device 1350 is a portable media device that is powered by a battery 1374. The electronic device 1350 can also include a RAM 1370 and a Read-Only Memory (ROM) 1372. The ROM 1372 can store programs, utilities or processes to be executed in a non-volatile manner. The RAM 1370 provides volatile data storage, such as for the cache 1356.

The electronic device 1350 also includes a user input device 1358 that allows a user of the electronic device 1350 to interact with the electronic device 1350. For example, the user input device 1358 can take a variety of forms, such as a button, keypad, dial, touch screen, audio input interface, visual/image capture input interface, input in the form of sensor data, etc. Still further, the electronic device 1350 includes a display 1360 (screen display) that can be controlled by the processor 1352 to display information to the user. A data bus 1366 can facilitate data transfer between at least the file system 1354, the cache 1356, the processor 1352, and the CODEC 1363.

In one embodiment, the electronic device 1350 serves to store a plurality of media items (e.g., songs, podcasts, etc.) in the file system 1354. When a user desires to have the electronic device play a particular media item, a list of available media items is displayed on the display 1360. Then, using the user input device 1358, a user can select one of the available media items. The processor 1352, upon receiving a selection of a particular media item, supplies the media data (e.g., audio file) for the particular media item to a coder/decoder (CODEC) 1363. The CODEC 1363 then produces analog output signals for a speaker 1364. The speaker 1364 can be a speaker internal to the electronic device 1350 or external to the electronic device 1350. For example, headphones or earphones that connect to the electronic device 1350 would be considered an external speaker.

The electronic device 1350 also includes a network/bus interface 1361 that couples to a data link 1362. The data link 1362 allows the electronic device 1350 to couple to a host computer or to accessory devices. The data link 1362 can be provided over a wired connection or a wireless connection. In the case of a wireless connection, the network/bus interface 1361 can include a wireless transceiver. The media items (media assets) can pertain to one or more different types of media content. In one embodiment, the media items are audio tracks (e.g., songs, audio books, and podcasts). In another embodiment, the media items are images (e.g., photos). However, in other embodiments, the media items can be any combination of audio, graphical or visual content. Sensor 1376 can take the form of circuitry for detecting any number of stimuli. For example, sensor 1376 can include a Hall Effect sensor responsive to external magnetic field, an audio sensor, a light sensor such as a photometer, and so on.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A composite structure, comprising:
   a ring of stacked unidirectional fiber layers aligned in a first direction, each fiber layer having unidirectional fibers within a binder and having opposing first and second surfaces, wherein the ring has an outer edge formed by the first surface of an outermost one of the fiber layers and an inner edge formed by the second surface of an innermost one of the fiber layers; and
   a first reinforced region and a second reinforced region, the first and second reinforced regions each including a reinforcing agent infused with a plastic binder, the first and second reinforced regions being non-contiguous with each other and on opposite sides of the ring, the first and second reinforced regions providing enhanced structural strength for the ring,
   wherein the first and second reinforced regions are defined by a first scrim layer and a second scrim layer, the first scrim layer positioned between the first reinforced region and the ring, the second scrim layer positioned between the second reinforced region and the ring, each scrim layer formed of stacked unidirectional fiber layers aligned in a second direction different than the first direction.

2. The composite structure of claim 1, wherein the reinforcing agent is comprised of carbon fiber.

3. The composite structure of claim 2, wherein the ring of stacked unidirectional fiber layers is substantially free of the carbon fiber.

4. The composite structure of claim 1, wherein the unidirectional fibers are radio transparent.

5. The composite structure as recited in claim 1, wherein the first and second scrim layers prevent substantial migration of the reinforcing agent from the first and second reinforced regions to the ring.

6. The composite structure of claim 1, wherein the reinforcing agent has a higher modulus of elasticity than the ring of stacked unidirectional fibers.

7. The composite structure of claim 1, wherein the reinforcing agent is conductive.

8. The composite structure of claim 1, wherein the first and second reinforced regions each have a thickness of between about 0.05 mm and 0.5 mm.

9. The composite structure of claim 1, wherein the composite structure forms a supportive frame.

10. The composite structure of claim 1, wherein a portion of the composite structure between the first and second reinforced regions is substantially free of carbon fiber.

11. The composite structure of claim 1, wherein the reinforcing agent has a modulus of about 377 GPa.

12. The composite structure of claim 1, wherein the ring is comprised of glass fiber reinforced plastic (GFRP).

13. The composite structure of claim 1, wherein the first and second reinforced regions are each formed of carbon fiber reinforced plastic (CFRP).

14. A composite structure, comprising:
a ring having a first side and an opposing second side, the ring comprised of unidirectional fibers aligned in a first direction;
a reinforcement system arranged to provide structural strength to the ring, the reinforcement system including a first portion reinforcing the first side of the ring and a second portion reinforcing the second side of the ring, the first and second portions being non-contiguous with each other and each including a reinforcing agent; and
an anti-migration system arranged to prevent migration of the reinforcing agent within the ring, the anti-migration system including a first scrim layer positioned between the first portion and the ring, and a second scrim layer positioned between the second portion and the ring, each scrim layer including unidirectional fibers aligned in a second direction different than the first direction.

15. The composite structure of claim 14, wherein the composite structure is a supportive frame for an accessory unit for an electronic device.

16. The composite structure of claim 15, wherein the first and second reinforced regions are on top and bottom portions of the frame.

17. The composite structure of claim 14, wherein the ring is comprised of glass fiber reinforced plastic (GFRP).

18. The composite structure of claim 14, wherein first and second portions of the reinforcement system is each comprised of carbon fiber reinforced plastic (CFRP).

* * * * *

UNITED STATES PATENT AND TRADEMARK OFFICE
CERTIFICATE OF CORRECTION

| | | |
|---|---|---|
| PATENT NO. | : 8,790,758 B2 | Page 1 of 1 |
| APPLICATION NO. | : 13/725891 | |
| DATED | : July 29, 2014 | |
| INVENTOR(S) | : Kevin Kenney et al. | |

It is certified that error appears in the above-identified patent and that said Letters Patent is hereby corrected as shown below:

In the Claims:

Column 20, line 15 (Claim 16, line 2): "second reinforced regions" should read --second portions--.

Signed and Sealed this
Sixth Day of January, 2015

Michelle K. Lee
*Deputy Director of the United States Patent and Trademark Office*